(12) United States Patent
Yasui et al.

(10) Patent No.: US 8,165,756 B2
(45) Date of Patent: Apr. 24, 2012

(54) STEERING CONTROL DEVICE FOR VEHICLE

(75) Inventors: Yoshiyuki Yasui, Nagoya (JP);
Toshihisa Kato, Handa (JP); Junya Nagaya, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 505 days.

(21) Appl. No.: 12/406,362

(22) Filed: Mar. 18, 2009

(65) Prior Publication Data
US 2009/0248250 A1    Oct. 1, 2009

(30) Foreign Application Priority Data

Mar. 31, 2008   (JP) ................................. 2008-090133
Mar. 31, 2008   (JP) ................................. 2008-090147

(51) Int. Cl.
*A01B 69/00*    (2006.01)

(52) U.S. Cl. ................ 701/42; 701/36; 701/41; 701/72; 180/167

(58) Field of Classification Search .................... 701/36, 701/42, 41, 70, 72, 80, 84, 74, 96, 220; 303/140, 303/146, 147, 148; 180/197, 445, 167, 168
See application file for complete search history.

(56) References Cited

U.S. PATENT DOCUMENTS 5,774,819 A    6/1998 Yamamoto et al.
6,415,215 B1 *  7/2002 Nishizaki et al. ............... 701/70

FOREIGN PATENT DOCUMENTS

JP            3034430 B2    4/2000

* cited by examiner

*Primary Examiner* — Gertrude Arthur Jeanglaude
(74) *Attorney, Agent, or Firm* — Buchanan Ingersoll & Rooney PC

(57) ABSTRACT

A vehicle steering control device includes a yawing value obtaining unit which obtains a yawing value corresponding to a vehicle yawing motion, a stabilizing force calculating unit which calculates a stabilizing force for assisting an operation of a steering operation member, operated by a driver for steering a steered wheel of the vehicle, in a direction opposite a direction of the vehicle yawing motion, based on the yawing value, and a force applying unit which applies the stabilizing force to the steering operation member in the direction opposite the yawing motion direction, wherein the stabilizing force calculating unit includes a counter-steer value calculating unit which calculates a counter-steer value indicating a degree of steering the steered wheel in the direction opposite the yawing motion direction, and wherein the stabilizing force is adjusted based on the counter-steer value.

17 Claims, 24 Drawing Sheets

STEERING CONTROL DEVICE FOR VEHICLE

CROSS REFERENCE TO RELATED APPLICATIONS

This application is based on and claims priority under 35 U.S.C. §119 to Japanese Patent Application 2008-090133, filed on Mar. 31, 2008, and Japanese Patent Application 2008-090147, filed on Mar. 31, 2008, the entire contents of which are incorporated herein by reference.

FIELD OF THE INVENTION

The present invention relates to a steering control device for a vehicle.

BACKGROUND

In a case where oversteer occurs while a vehicle is turning (i.e. while the vehicle is in a turning state), it is effective to steer a steering operation member (a steering wheel) in a direction opposite to a direction of a yawing motion of the vehicle so as to steer steered wheels in the direction opposite to the direction of the yawing motion in order to stabilize the vehicle by reducing a degree of the oversteer.

In a case where a slip restricting control (which will be hereinafter referred to as a μ split control), such as an anti-skid control (ABS control), a traction control (TCS control) and the like for restricting a slip occurring at a wheel, is executed while the vehicle is traveling on a road surface, in which a friction coefficient of a road surface contacting a left wheel and a friction coefficient of the road surface contacting a right wheel differ from one another (which will be hereinafter referred to as a μ split road surface), a difference (a braking force difference in a case where the ABS control is executed, a driving force difference in a case where the TCS control is executed) is generated between longitudinal forces of the right wheels and the left wheels (i.e. a frictional force generated between the road surface and a tire in an acceleration/deceleration direction, which is also referred to as the braking/driving force). A deflection (yawing motion) may occur at the vehicle because of the longitudinal force difference between the right and left wheels. In order to restrict the deflection of the vehicle and to stabilize the vehicle, it is effective to steer the steering operation member in the direction opposite to the direction of the yawing motion of the vehicle so as to steer the steered wheels in the direction opposite to the direction of the yawing motion.

The above-described operation of steering the steering operation member in the direction opposite to the direction of the yawing motion of the vehicle is also referred to as a counter-steer (a counter-steering operation). Hereinafter, the steering direction opposite to the direction of the yawing motion of the vehicle is also referred to as a counter-steering direction. More specifically, the counter-steering direction is a direction of steering the steering wheel in a clockwise direction when viewed from a driver in a case where the yawing motion occurs at the vehicle in a direction of turning left (a direction of deflecting to the left). Further, the counter-steering direction is a direction of steering the steering wheel in a counterclockwise direction when viewed from the driver in a case where the yawing motion occurs at the vehicle in a direction of turning right (a direction of deflecting to the right).

Disclosed in JP3034430B is a device for applying a stabilizing force (a stabilizing torque) for inducing or assisting a counter-steering operation, performed by the driver, relative to the steering operation member in the counter-steering direction in a case where the oversteer occurs (i.e. in a case where the counter-steering operation is needed).

A driver skilled in the counter-steering operation (which will be hereinafter referred to as a skilled driver) may actively perform an appropriate counter-steering operation by himself/herself while predicting a behavior of the vehicle in the case where the counter-steering operation is needed, e.g. in the case where the oversteer occurs, in the case where the vehicle deflection, which occurs due to the longitudinal force difference between the right and left wheels, occurs, and the like. Accordingly, for example, in the case where the oversteer occurs while the skilled driver drives the vehicle, to which the device disclosed in JP3034430B is mounted, the skilled driver is likely to perform the counter-steering operation while feeling a lower steering force than a normal (predicted) steering force (an operating torque, a reaction force of the road surface) because of an application of the stabilizing torque. As a result, the skilled driver may feel discomfort when the steering force during the counter-steering operation is reduced contrary to his/her expectation.

A need thus exists to provide a steering control device for a vehicle which is not susceptible to the drawback mentioned above. More specifically, the purpose of the present invention is to provide the steering control device for the vehicle, which applies a stabilizing force (a stabilizing torque) for assisting (inducing) a counter-steering operation performed by a driver relative to a steering operation member in a counter-steering direction when the counter-steering operation is needed, while preventing the driver from having a discomfort feeling that a steering force during the counter-steering operation is reduced contrary to his/her expectation.

SUMMARY OF THE INVENTION

According to an aspect of the present invention, a steering control device for a vehicle includes a yawing value obtaining means for obtaining a yawing value, which is a value corresponding to a yawing motion of the vehicle, a stabilizing force calculating means for calculating a stabilizing force for assisting (inducing) an operation of a steering operation member, which is operated by a driver of the vehicle in order to steer a steered wheel of the vehicle, in a direction opposite to a direction of the yawing motion of the vehicle, on the basis of the yawing value, and a force applying means for applying the stabilizing force to the steering operation member in the direction opposite to the direction of the yawing motion of the vehicle, wherein the stabilizing force calculating means includes a counter-steer value calculating means for calculating a counter-steer value, which indicates a degree of steering the steered wheel in the direction opposite to the direction of the yawing motion of the vehicle, and wherein the stabilizing force is adjusted on the basis of the counter-steer value.

The force applying means applies the stabilizing force to the steering operation member in the counter-steering direction (the direction of steering the steered wheel in the counter-steering direction). Accordingly, the counter-steering operation by the driver is assisted (induced).

According to another aspect of the present invention, a steering control for a vehicle includes a yawing value obtaining means for obtaining a yawing value, which is a value corresponding to a yawing motion of the vehicle, a stabilizing force calculating means for calculating a stabilizing force for assisting (inducing) an operation of a steering operation member, which is operated by a driver of the vehicle in order to steer a steered wheel of the vehicle, in a direction opposite to a direction of the yawing motion of the vehicle, on the basis of the yawing value, and a force applying means for applying the stabilizing force to the steering operation member in the direction opposite to the direction of the yawing motion of the vehicle, wherein the stabilizing force calculating means includes a counter-steer value calculating means for calculating a counter-steer value, which indicates a degree of steering the steered wheel in the direction opposite to the direction of the yawing motion of the vehicle, and wherein the force applying means determines whether or not the operation of the steering operation member in the direction opposite to the direction of the yawing motion of the vehicle is performed by the driver on the basis of the counter-steer value, so that the force applying means does not apply the stabilizing force in a case where the force applying means determines that the operation is performed, and so that the force applying means applies the stabilizing force in a case where the force applying means determines that the operation is not performed.

Accordingly, in a case where a skilled driver performs an appropriate counter-steering operation while predicting a behavior of the vehicle, the stabilizing force is not applied to the steering operation member. Accordingly, a sense of discomfort a skilled driver feels, that a steering force is reduced in contrary to his/her expectation, is prevented. On the other hand, in the case where the driver does not perform the counter-steering operation, the appropriate degree of the stabilizing force is applied. As a result, the counter-steering operation is appropriately and sufficiently assisted (induced) for the driver, who is not skilled, by the appropriate degree of the stabilizing force.

According to a further aspect of the present invention, a steering control device for a vehicle includes a state quantity calculating means for obtaining a value, which corresponds to a yawing motion of the vehicle, and calculating an oversteer state quantity, which indicates a degree of an oversteer of the vehicle, on the basis of the value corresponding to the yawing motion, a target steering angle calculating means for calculating a value, which stabilizes the vehicle and which corresponds to a target steering angle of a steered wheel of the vehicle in a direction opposite to a turning direction of the vehicle, on the basis of the oversteer state quantity, an actual steering angle obtaining means for obtaining a value, which corresponds to an actual steering angle of the steered wheel, a stabilizing force calculating means for calculating a stabilizing force for assisting (inducing) an operation of a steering operation member, which is operated by a driver of the vehicle in order to steer the steered wheel of the vehicle, in the direction opposite to the turning direction, on the basis of a comparison result between the target steering angle corresponding value and the actual steering angle corresponding value, and a force applying means for applying the stabilizing force to the steering operation member in the direction opposite to the turning direction.

Accordingly, in the case where the skilled driver performs the appropriate counter-steering operation with predicting the behavior of the vehicle (i.e. in a case where a degree of achievement of the counter-steering operation is great), the stabilizing force to be applied to the steering operation member is determined to be smaller. In other words, a degree of reducing the steering force (the steering torque) by the stabilizing force becomes smaller. Accordingly, the sense of discomfort the skilled driver feels, that the steering force during the counter-steering operation is reduced in contrary to his/her expectation, is restricted. Further, in the case where the steering angle deviation is great, in other words, in the case where the driver does not perform the appropriate counter-steering operation, the stabilizing force is determined to be a greater value. As a result, the counter-steering operation is appropriately and sufficiently assisted (induced) for the driver, who is not skilled, by the greater stabilizing force.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Embodiments of a steering control device for a vehicle will be described below in accordance with the attached drawings.

[First Embodiment]

Figure 1:
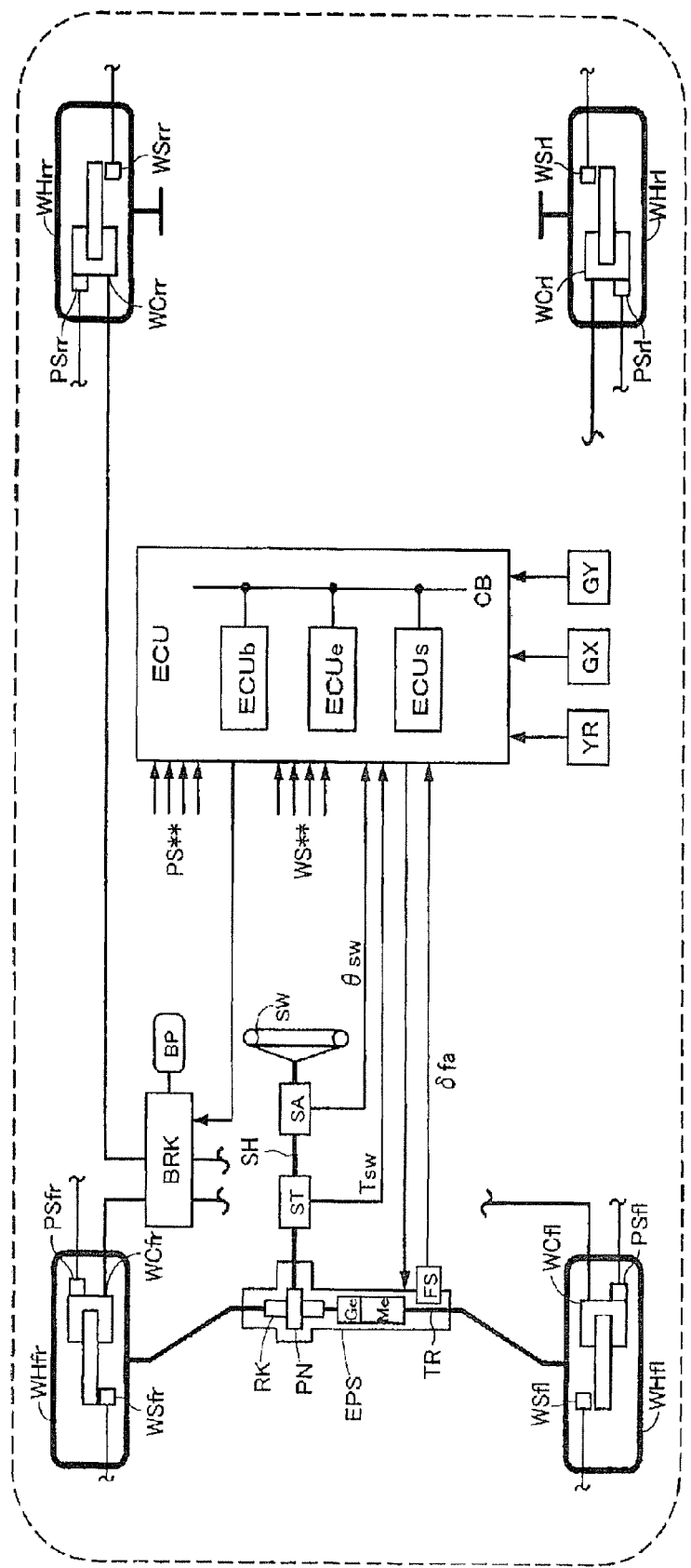
FIG. 1 is a diagram schematically illustrating a configuration of a vehicle to which a steering control device relating to a first embodiment is mounted.

Illustrated in FIG. 1 is a schematic configuration of the vehicle, to which the steering control device according to a first embodiment is mounted.

In the first embodiment, when a steering wheel SW, which serves as a steering operation member, is operated, a rotational motion of the steering wheel SW is transmitted to a pinion gear PN as a rotational motion via a steering shaft SH. The rotational motion of the pinion gear PN is converted into a reciprocating motion (a movement in a right/left direction (a lateral direction) of a vehicle body) of a rack RK by means of the rack RK engaged with the pinion gear PN. A tie rod TR, which is integrally formed at the rack RK, moves in the right/left direction of the vehicle body in response to the movement of the rack RK, thereby steering steered wheels WHfl and WHfr, which are front wheels in this embodiment. Hence, an operating angle of the steering wheel SW from a neutral position is determined to correspond to a steering angle of the steered wheels WHfl and WHfr from a neutral position (i.e. a state where the vehicle travels straight).

An electric motor Me is connected to the tie rod TR via a reduction mechanism Ge. An operating force of the steering wheel SW (which is hereinafter referred to as a steering wheel operating force (i.e. steering torque)) applied by the driver is reduced by a driving force of the electric motor Me. In other words, a function of a so-called power steering control (power assisted steering control, EPS control) is achieved by the electric motor Me reducing the steering wheel operating force by the driving force of the electric motor Me.

A brake actuator BRK has a known configuration in which plural electromagnetic valves, a hydraulic pump, an electric motor and the like are included. The brake actuator BRK supplies a brake hydraulic pressure in response to an operation of a brake pedal BP by the driver to a wheel cylinder WC of each wheel when a brake control is not executed, so that a braking torque is applied to each wheel in response to the operation of the brake pedal BP. Further, the brake actuator BRK is configured to individually control the brake hydraulic pressure within the wheel cylinder WC independently of the operation of the brake pedal BP when the brake control, such as an anti-skid control (ABS control), a traction control (TCS control), a vehicle stability control (ESC control) for controlling an understeer/oversteer of the vehicle, or the like is executed, so that the braking torque is individually and separately adjusted for each wheel. Additionally, adjustment of the braking torque may be achieved by using an electric brake apparatus without using the brake hydraulic pressure.

Symbols '' are used to comprehensively indicate wheels, specifically, 'fl' indicates a front-left wheel, 'fr' indicate a front-right wheel, 'rl' indicates a rear-left wheel, and 'rr' indicates a rear-right wheel. Hence, for example, the wheel cylinder WC comprehensively indicates a front-left wheel cylinder WCfl, a front-right wheel cylinder WCfr, a rear-left wheel cylinder WCrl, and a rear-right wheel cylinder WCrr.

In the first embodiment, the steering control device includes a wheel speed sensor WS for detecting a wheel speed Vw, a steering wheel rotational angle sensor SA for detecting a rotational angle (from the neutral position) of the steering wheel SW (i.e. a steering wheel operating angle θsw), a steering torque sensor ST for detecting a steering torque Tsw of the steering wheel SW generated by the driver, a yaw rate sensor YR for detecting a yaw rate Yr of the vehicle body, a longitudinal acceleration sensor GX for detecting an acceleration generated in a front-rear direction (a longitudinal direction) of the vehicle body (i.e. a longitudinal acceleration Gx), a lateral acceleration sensor GY for detecting an acceleration generated in the lateral direction of the vehicle body (i.e. a lateral acceleration Gy), a steering angle sensor FS for detecting a steering angle δfa of the front wheels (the steered wheels) WHfl and WHfr from the neutral position, a wheel cylinder pressure sensor PS for detecting a wheel cylinder pressure Pw, and an electronic control unit (ECU).

The ECU is a microcomputer that is configured with ECUb, ECUe and ECUs, which are connected to one another by means of a communication bus CB. The ECU is electrically connected to above-described each actuator such as the brake actuator BRK, and above-described each sensor and the like.

The ECUb is configured so as to execute the brake control such as the ABS control, the TCS control, the ESC control and the like on the basis of signals outputted from the wheel speed sensor WS**, the longitudinal acceleration sensor GX, the lateral acceleration sensor GY, and the like. The ECUe is configured so as to execute a control of an engine, which is not illustrated. The ECUe is configured so as to execute the EPS control on the basis of a signal outputted from the steering torque sensor ST and the like.

[Oversteer Restricting Control]

Figure 2:
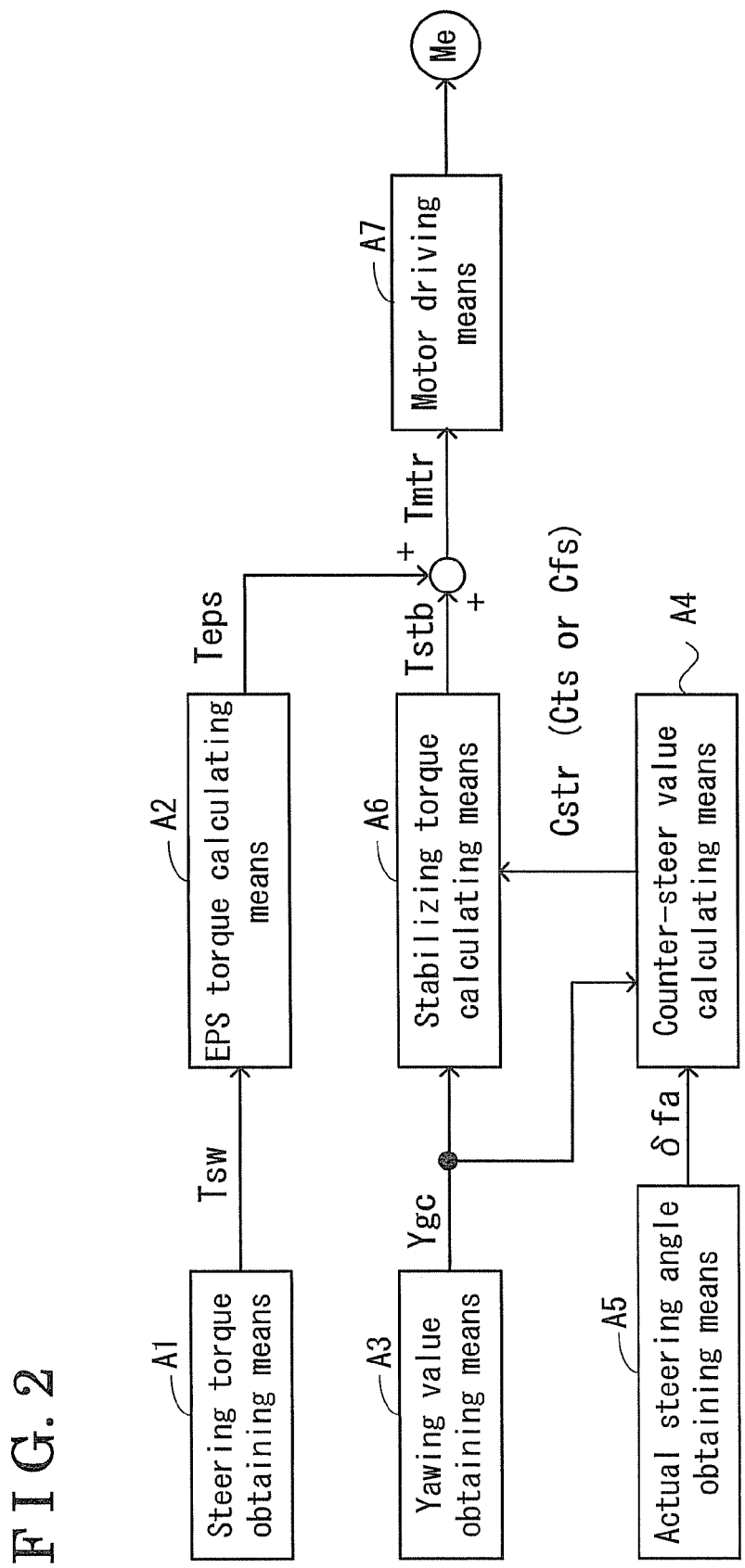
FIG. 2 is a functional block diagram of when an oversteer restricting control is executed by the steering control device illustrated in FIG. 1.

An oversteer restricting control executed by the steering control device according to the first embodiment will be described below with reference to FIG. 2. In the first embodiment, only a steering torque control is executed as the oversteer restricting control. Accordingly, the steering torque control will be described hereinbelow.

At a steering torque obtaining means A1, the steering torque Tsw of the steering wheel SW (i.e. the operating force of the steering operation member), generated by the driver, is obtained by the steering torque sensor ST. An EPS torque calculating means A2 calculates a target value Teps of a power steering torque (EPS torque) (which will be hereinafter referred to as a EPS torque target value Teps) for reducing the steering torque of the driver on the basis of the obtained steering torque Tsw. The EPS torque target value Teps is calculated in a manner where the greater the steering torque Tsw is, the greater value the EPS torque target value Teps is calculated to be. The EPS torque target value Teps is a value directing to reduce the steering torque Tsw of the driver.

A yawing value Ygc, which represents a yawing motion of the vehicle, is obtained at a yawing value obtaining means A3. The yawing motion is a motion of the vehicle in a yaw direction, and a motion in which a traveling direction of the vehicle changes (i.e. a motion in which the vehicle deflects). Accordingly, the yaw rate Yr or a value calculated on the basis of the yaw rate Yr is used as the yawing value Ygc.

The yawing motion is generated as a result of a force acting on the wheels. Accordingly, the force acting on the wheels and causing the yawing motion, or a yawing moment (which will be hereinafter referred to simply as a moment) generated due to the force acting on the wheels may be adapted as the yawing value Ygc. In other words, a difference hFx (a longitudinal force difference) of a longitudinal force Fx** (a braking force for decelerating the vehicle or a driving force for accelerating the vehicle) between the right-wheels and the left-wheels may be adapted as the yawing value Ygc.

Figure 3:
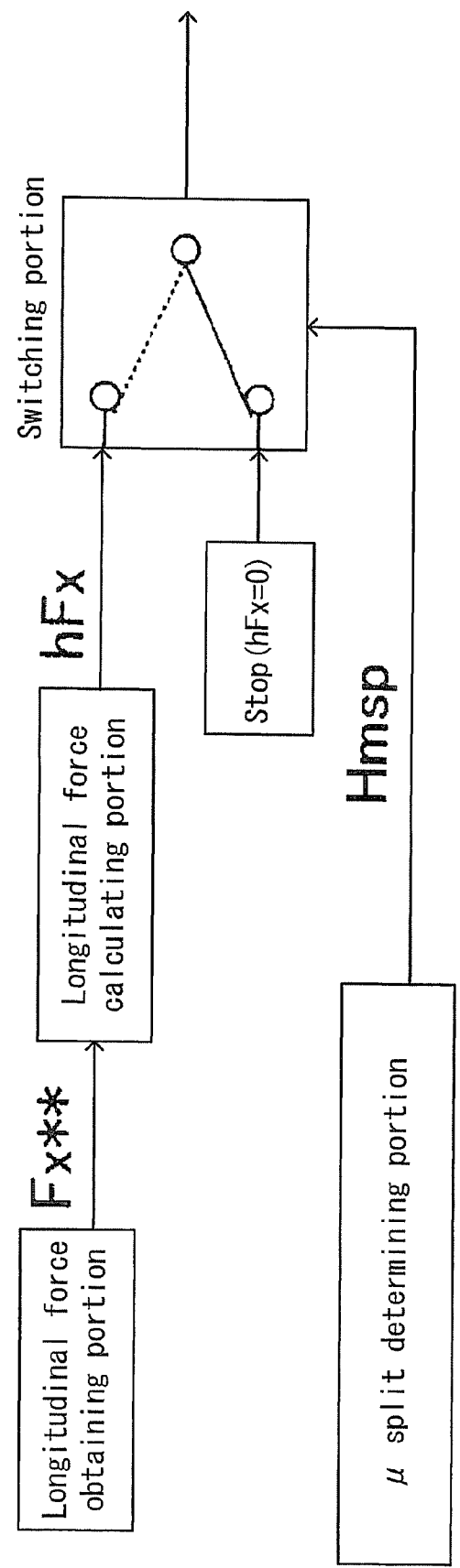
FIG. 3 is a functional block diagram of when a longitudinal force difference between the right and left wheels is obtained as a yawing value by a yawing value obtaining means illustrated in FIG. 2.

The longitudinal force difference hFx is obtained as illustrated in, for example, FIG. 3. More specifically, the longitudinal force difference hFx is obtained as follows. Firstly, the longitudinal force Fx of the wheel WH is obtained at a longitudinal force obtaining portion. The longitudinal force Fx of the wheel WH is calculated at a longitudinal force calculating portion by one of the known methods by using the wheel cylinder pressure Pw obtained by the wheel cylinder pressure sensor PS, the wheel speed Vw obtained by the wheel speed sensor WS and the like. Alternatively, the longitudinal force Fx may be calculated from, for example, the braking torque of the wheel WH obtained from the wheel cylinder pressure Pw, a driving torque of the wheel WH obtained from a driving torque of the engine, an angular acceleration of the wheel WH, which is a derivative value of the wheel speed Vw, and an equation of a rotational motion of the wheel WH or the like. Further, the steering control device of the first embodiment may be modified so as not to include the wheel cylinder pressure sensor PS. In this case, the longitudinal force Fx** may be estimated on the basis of an operating condition of the hydraulic pressure pump, the motor, the electromagnetic valves and the like, which configure the brake actuator BRK.

Secondly, the difference hFx of the longitudinal force between the right and left wheels (i.e. the longitudinal force difference hFx) is calculated on the basis of the longitudinal force Fx**. For example, the longitudinal force difference hFx is calculated on the basis of an equation: hFx=(Fxfr+Fxrr)−(Fxfl+Fxrl). In the anti-skid control, a so-called select-low control may be executed in a braking torque control of the rear wheels WHrl and WHrr. In this case, the difference does not occur between the braking forces of the rear-left wheel WHrl and the rear-right wheel WHrr. Accordingly, the difference between the braking forces of the front-left wheel WHfl and the front-right wheel WHfr may be adapted as the longitudinal force difference hFx (=Fxfr−Fxfl).

The steering control device may be modified so as to output the longitudinal force difference hFx, which is calculated as above, only while the above-mentioned (in the background section) μ split control (i.e. the slip restricting control such as the ABS control, the TSC control and the like executed while the vehicle travels on the μ split road surface) is being executed, and so as not to output the longitudinal force difference hFx in other cases. In this case, the steering control device may be modified so as to determine whether or not the μ split control is being executed (a μ split determination) at a μ split determining portion, so that the longitudinal force difference hFx is outputted in a case where the μ split control is being executed and so that the longitudinal force difference hFx is not outputted (hFx=0 (Stop)) in a case where the μ split is not executed on the basis of the determination result Hmsp.

Figure 4:
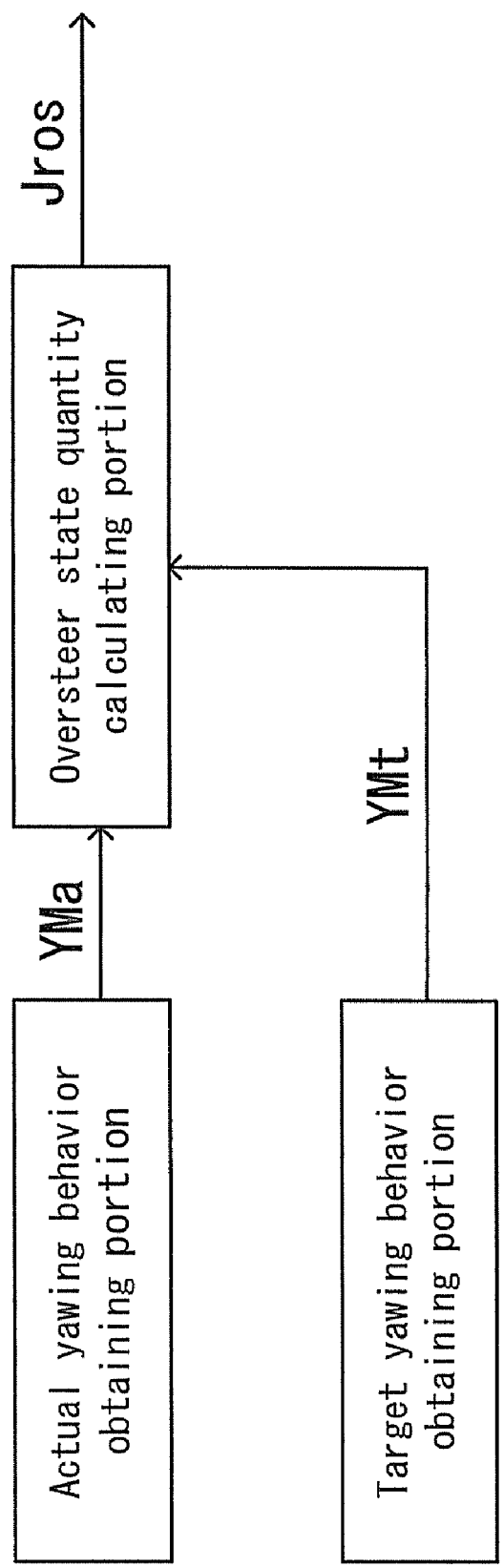
FIG. 4 is a functional block diagram of when an oversteer state quantity is obtained as the yawing value by the yawing value obtaining means illustrated in FIG. 2.

Further, an oversteer state quantity Jros, which indicates a degree of the oversteer occurring at the vehicle, may be adapted as the yawing value Ygc. The oversteer state quantity Jros is obtained as illustrated in, for example, FIG. 4. More specifically, the oversteer state quantity Jros is obtained as follows. Firstly, an actual yawing behavior YMa (e.g. the yaw rate Yr) is obtained at an actual yawing behavior obtaining portion. Secondly, a target yawing behavior YMt is calculated at a target yawing behavior obtaining portion. The target yawing behavior YMt is calculated on the basis of, for example, the steering wheel operating angle θsw, a vehicle speed Vx obtained from the wheel speed Vw** and the like. Then, the oversteer state quantity Jros is calculated at an oversteer state quantity calculating portion on the basis of a comparison result between the actual yawing behavior YMa and the target yawing behavior YMt (e.g. a deviation between the actual yawing behavior YMa and the target yawing behavior YMt).

Alternatively, the oversteer state quantity Jros may be calculated on the basis of the actual yawing behavior YMa without using the target yawing behavior YMt. In this case, for example, the oversteer state quantity Jros is calculated on the basis of a table illustrated in FIG. 5, a sideslip angle β (a slip angle β) of the vehicle, and a sideslip angular speed dβ of the vehicle. According to the table illustrated in FIG. 5, the oversteer state quantity Jros is determined to be a greater value in response to an increase of the sideslip angle β and the sideslip angular speed dβ (i.e. the oversteer state quantity Jros is determined to be a greater value in the upper right range of the table illustrated in FIG. 5), with reference to a curved line indicating that the oversteer state quantity Jros is zero (0) as a base line.

The sideslip angle β of the vehicle (the actual yawing behavior YMa) is calculated by using the know method on the basis of the yaw rate Yr, the lateral acceleration Gy, the vehicle speed Vx and the like. Similarly, the sideslip angular speed dβ (the actual yawing behavior YMa) is calculated by using the known method on the basis of the yaw rate Yr, the lateral acceleration Gy, the vehicle speed Vx and the like.

Figure 5:
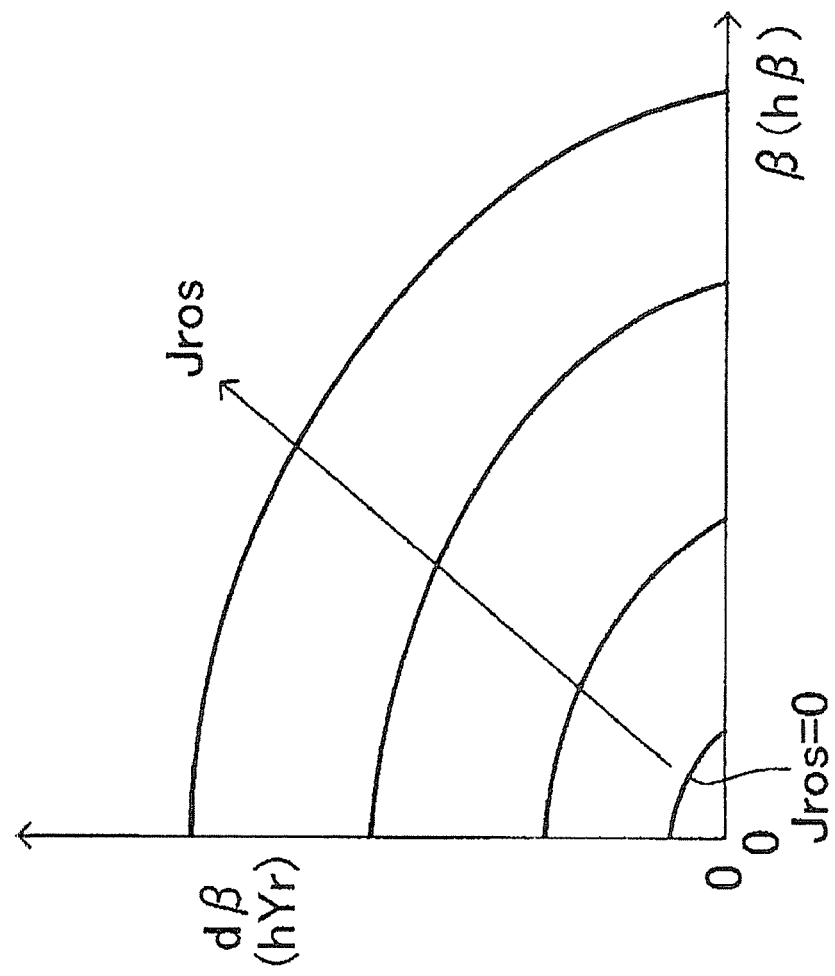
FIG. 5 is a graph illustrating a characteristic of the oversteer state quantity relative to a sideslip angle and a sideslip angular speed of the vehicle.

Additionally, the sideslip angle β may be replaced with a sideslip angular deviation hβ in a horizontal axis in the table illustrated in FIG. 5. The sideslip angular deviation hβ is a deviation between a target value βt of the sideslip angle (which will be hereinafter referred to as a sideslip angle target value βt) (the target yawing behavior YMt) and an actual value βa of the sideslip angle (the actual yawing behavior YMa). Similarly, the sideslip angular speed dβ may be replaced with a yaw rate deviation hYr in a vertical axis in the table illustrated in FIG. 5. The yaw rate deviation hYr is a deviation between a target value Yrt of the yaw rate (which will be hereinafter referred to as a yaw rate target value Yrt) (the target yawing behavior YMt) and an actual value Yra of the yaw rate (the actual yawing behavior YMa). Each of the sideslip angle target value βt and the yaw rate target value Yrt is calculated by using the know method on the basis of a driving operation of the driver (i.e. the steering wheel operating angle θsw, the vehicle speed Vx and the like). Described above is the yawing value obtaining means A3.

Referring to FIG. 2 again, a counter-steer value Cstr, which indicates a degree of the counter-steer by the driver, is calculated at a counter-steer value calculating means A4. An attained value Cts of the counter-steer (which will be hereinafter referred to as a counter-steer attained value Cts) or a deficient value Cfs of the counter-steer (which will be hereinafter referred to as a counter-steer deficient value Cfs) is adapted as the counter-steer value Cstr.

The counter-steer attained value Cts is a value corresponding to a degree of the counter-steer (the steering angle of the front-wheels in a counter-steering direction from the neutral position) performed by (achieved by) the driver. The counter-steer deficient value Cfs is a value corresponding to a degree of the counter-steer (the steering angle difference between the front-left wheel and the front-right wheel) lacking relative to the degree of the counter-steer necessary for stabilizing the vehicle.

The counter-steer attained value Cts is calculated on the basis of a degree of the actual steering angle δfa of a case where a sign of the yawing value Ygc (the direction of the yawing motion of the vehicle) opposes to a sign of the actual steering angle δfa (the steering direction of the front wheels from the neutral position).

For example, in a case where the sign of the actual steering angle δfa indicates a direction in which the vehicle turns right (which will be hereinafter referred to as a right-turn direction) (i.e. a clockwise direction of the steering wheel when viewed from the driver) while the vehicle is turning left (i.e. a sign of the yaw rate indicates a direction in which the vehicle turns left (which will be hereinafter referred to as a left-turn direction) (i.e. a counterclockwise direction when viewed from above the vehicle)), the actual steering angle δfa itself is adapted as the counter-steer attained value Cts. Alternatively, in a case where the actual steering angle δfa indicates the right-turn direction while the yawing moment is generated in the left-turn direction, which is generated due to the above-described longitudinal force difference hFx by executing the ABS control while the vehicle travels straight on the μ split road surface (i.e. the road surface having a high friction coefficient at the left side of the vehicle, the road surface having a low friction coefficient at the right side of the vehicle), the value δfa of the actual steering angle itself is adapted as the counter-steer attained value Cts.

Figure 6:
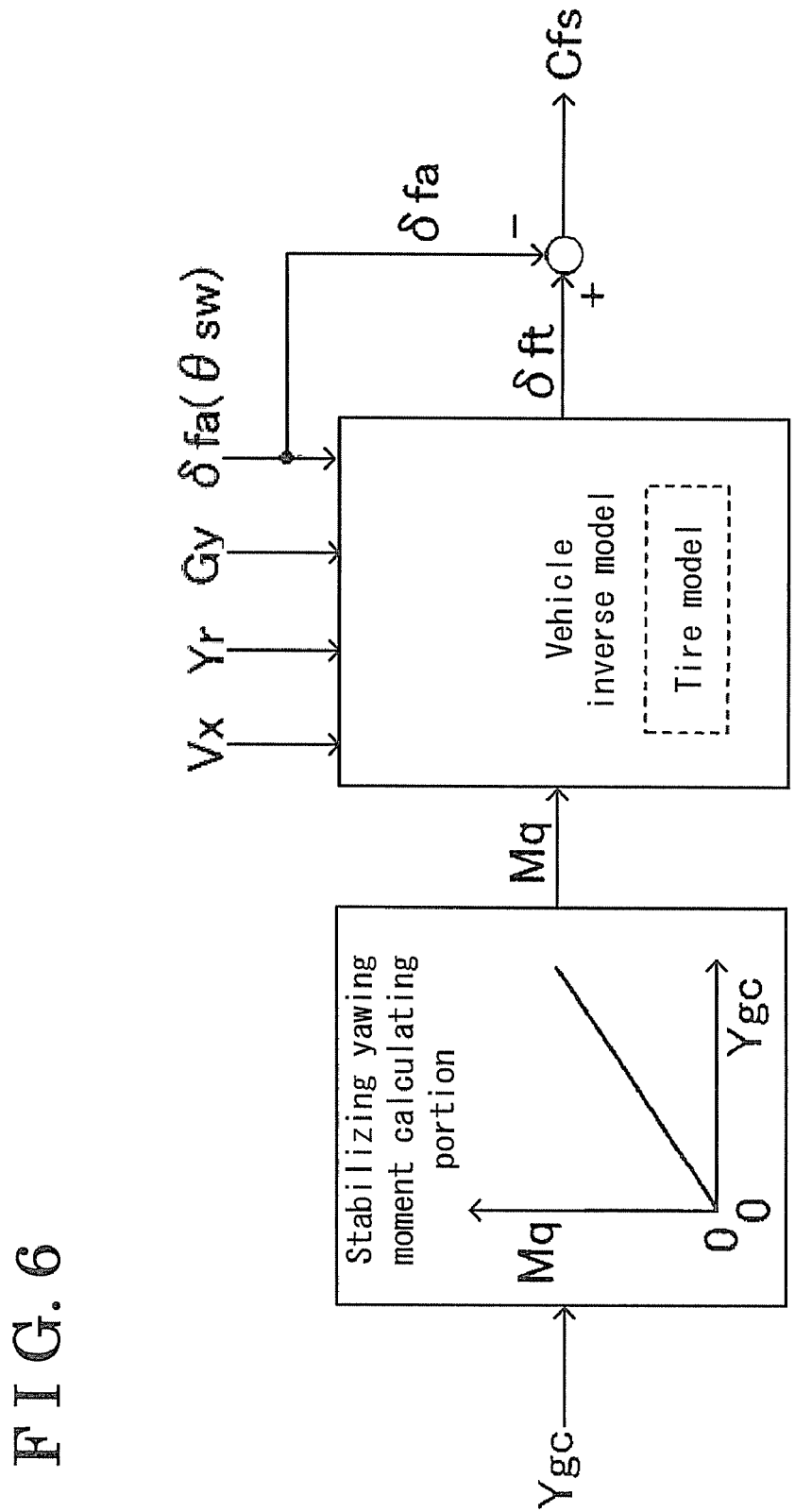
FIG. 6 is a functional block diagram of when a counter-steer deficient value is calculated as a counter-steer value by a counter-steer value calculating means illustrated in FIG. 2.

On the other hand, the counter-steer deficient value Cfs is calculated as illustrated in FIG. 6. More specifically, the counter-steer deficient value Cfs is calculated as follows. Firstly, a stabilizing yawing moment Mq necessary for stabilizing the vehicle is calculated on the basis of the yawing value Ygc at a stabilizing yawing moment calculating portion. Accordingly, the greater the yawing value Ygc is, the greater value the stabilizing yawing moment Mq is calculated to be.

Secondly, a target steering angle δft is calculated by inputting the stabilizing yawing moment Mq into an inverse model of the vehicle (i.e. a vehicle inverse model). The target steering angle δft is a steering angle of the front-wheels in the counter-steering direction necessary for ensuring a stability of the vehicle (i.e. for generating the yawing moment Mq). The inverse model of the vehicle is a model opposite to a vehicle model for calculating the vehicle behavior such as the yaw rate by inputting thereinto the vehicle speed, the steering angle and the like. Further, the inverse model of the vehicle is a model for calculating the target steering angle δft of the front-wheels by inputting thereinto the vehicle behavior such as the yaw rate (i.e. a known simultaneous equation of motion). More specifically, for example, the target steering angle δft of the front wheels necessary for obtaining the stabilizing yawing moment Mq relative to the current vehicle speed Vx, the lateral acceleration Gy, the yaw rate Yr, the actual steering angle δfa (or, the steering wheel operating angle θsw) is calculated by using the inverse model of the vehicle including a tire model indicating a tire characteristic.

The stabilizing yawing moment calculating portion and the inverse model of the vehicle serve as a target steering angle calculating means.

The actual steering angle δfa of the front-wheels (the steered wheels) is obtained at an actual steering angle obtaining means A5. The actual steering angle δfa is calculated on the basis of a detection value of the steering angle sensor FS. Further, the actual steering angle δfa may be calculated by using a relationship: $\delta fa = \theta sw/SG$, on the basis of the steering wheel operating angle θsw, which is detected by the steering wheel rotational angle sensor SA. "SG" in the equation ($\delta fa = \theta sw/SG$) indicates a steering gear ratio.

Then, a deviation between the target steering angle δft and the actual steering angle δfa (i.e. steering angle deviation $h\delta f = \delta ft - \delta fa$) is adapted as the counter-steer deficient value Cfs.

Figure 7:
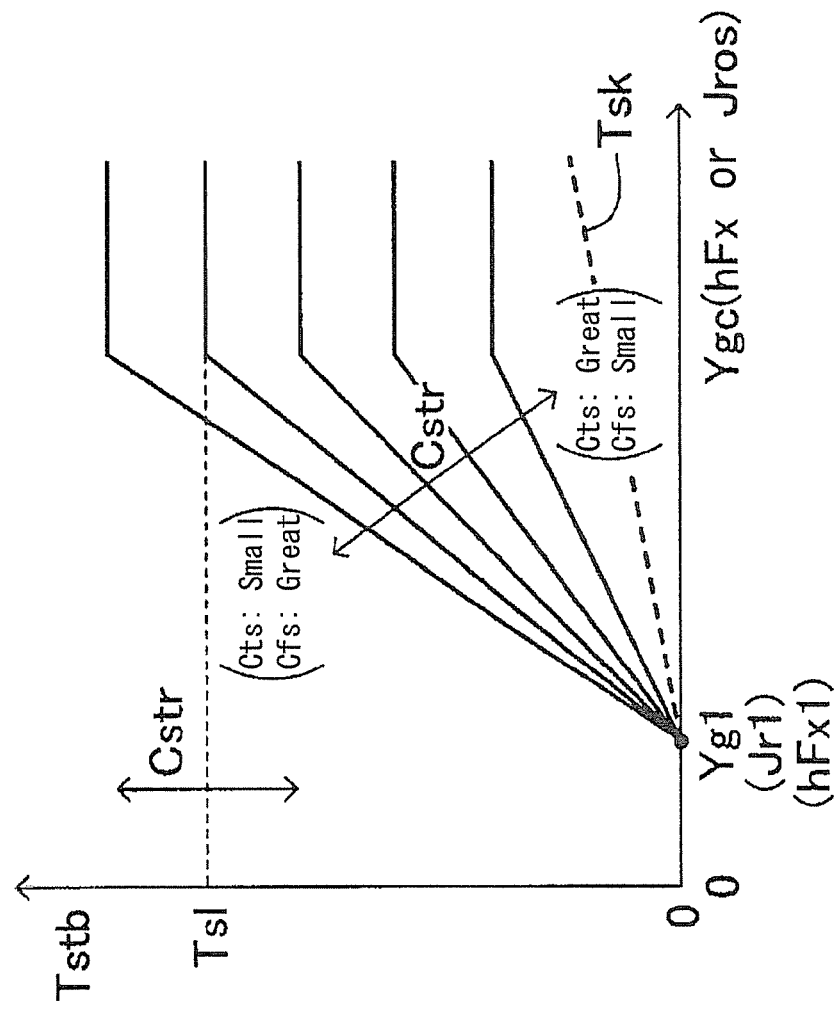
FIG. 7 is a graph illustrating a table, which is referred to by a stabilizing torque calculating means illustrated in FIG. 2 and specifies a relationship between the yawing value, the counter-steer value and a stabilizing torque.

A stabilizing torque Tstb, which corresponds to the stabilizing force and which is a steering torque for assisting (inducing) the counter-steering operation for stabilizing the vehicle, is calculated at a stabilizing torque calculating means A6 so as to follow a characteristic illustrated in FIG. 7 on the basis of the yawing value Ygc (the oversteer state quantity Jros or the longitudinal force difference hFx) and the counter-steer value Cstr (the counter-steer attained value Cts or the counter-steer deficient value Cfs). The stabilizing torque Tstb is a value of the counter-steering direction (i.e. a direction of steering the steered wheel in the counter-steering direction).

Accordingly, the stabilizing torque Tstb is calculated to zero (0) in a case where the yawing value Ygc (the oversteer state quantity Jros, the longitudinal force difference hFx) is equal to or less than a threshold value Ygl (Jrl, hFxl). On the other hand, in a case where the yawing value Ygc is greater than the threshold value Ygl, the stabilizing torque Tstb is calculated so as to increase from zero (0) in response to an increase of the yawing value Ygc from the threshold value Ygl. However, the stabilizing torque Tstb is limited to be equal to or lower than a limit value Tsl.

Additionally, in the case where the yawing value Ygc is greater than the threshold value Ygl, the greater the counter-steer attained value Cts is (or, the smaller the counter-steer deficient value Cfs is), the smaller value the stabilizing torque Tstb is adjusted to be. Further, the greater the counter-steer attained value Cts is (or, the smaller the counter-steer deficient value Cfs is), the smaller value the limit value Tsl is adjusted to be.

The electric motor Me is driven at a motor driving means A7 (a force applying means) on the basis of a target value Tmtr for drive-controlling the electric motor Me, which is obtained by adding the stabilizing torque Tstb to the EPS torque target value Teps (target value Tmtr=EPS torque target value Teps+stabilizing torque Tstb).

Accordingly, a driving force corresponding to the target value Tmtr is applied to the tie rod TR, thereby applying a torque of directing to reduce the steering torque Tsw of the driver (the EPS torque Teps) and a torque in the counter-steering direction (the stabilizing torque Tstb) relative to the steering wheel SW. As a result, the counter-steering operation by the driver is induced or assisted by the stabilizing torque Tstb.

As described above, the steering torque control is executed on the basis of the steering torque Tsw, the yawing value Ygc and the counter-steer value Cstr, so that the stabilizing torque Tstb is applied to the steering wheel SW in the counter-steering direction (the steering direction opposite to the yawing motion of the vehicle) while the vehicle is in the oversteer state.

As described above, the greater the counter-steer attained value Cts is (or, the smaller the counter-steer deficient value Cfs is), the smaller the stabilizing torque Tstb becomes (see FIG. 7). The counter-steer attained value Cts being great (or, the counter-steer deficient value Cfs being small) indicates that the driver performs an appropriate counter-steering operation. On the other hand, the counter-steer attained value Cts being small (or, the counter-steer deficient value Cfs being great) indicates that the driver does not perform the appropriate counter-steering operation, more specifically, the counter-steer attained value Cts being small (or, the counter-steer deficient value Cfs being great) indicates that the counter-steering operation is not performed at all or that the counter-steering operation is not sufficient.

Accordingly, in a case where the skilled driver performs the appropriate counter-steering operation while predicting the behavior of the vehicle (i.e. the counter-seer attained value Cts is great or the counter-steer deficient value Cfs is small), the stabilizing torque Tstb is set to be smaller, so that a degree of reducing the steering torque applied by the driver by the stabilizing torque Tstb becomes smaller. Accordingly, the sense of discomfort the skilled driver feels, that the steering force during the counter-steering operation is reduced in contrary to his/her expectation, is prevented.

On the other hand, in the case where the driver does not perform the appropriate counter-steering operation (i.e. the counter-steer attained value Cts is small or the counter-steer deficient value Cfs is great), the stabilizing torque Tstb is set to be greater. As a result, the counter-steering operation is appropriately and sufficiently induced or assisted for the driver, who is not skilled, by the stabilizing torque Tstb, which is set to be a greater value.

Figure 8:
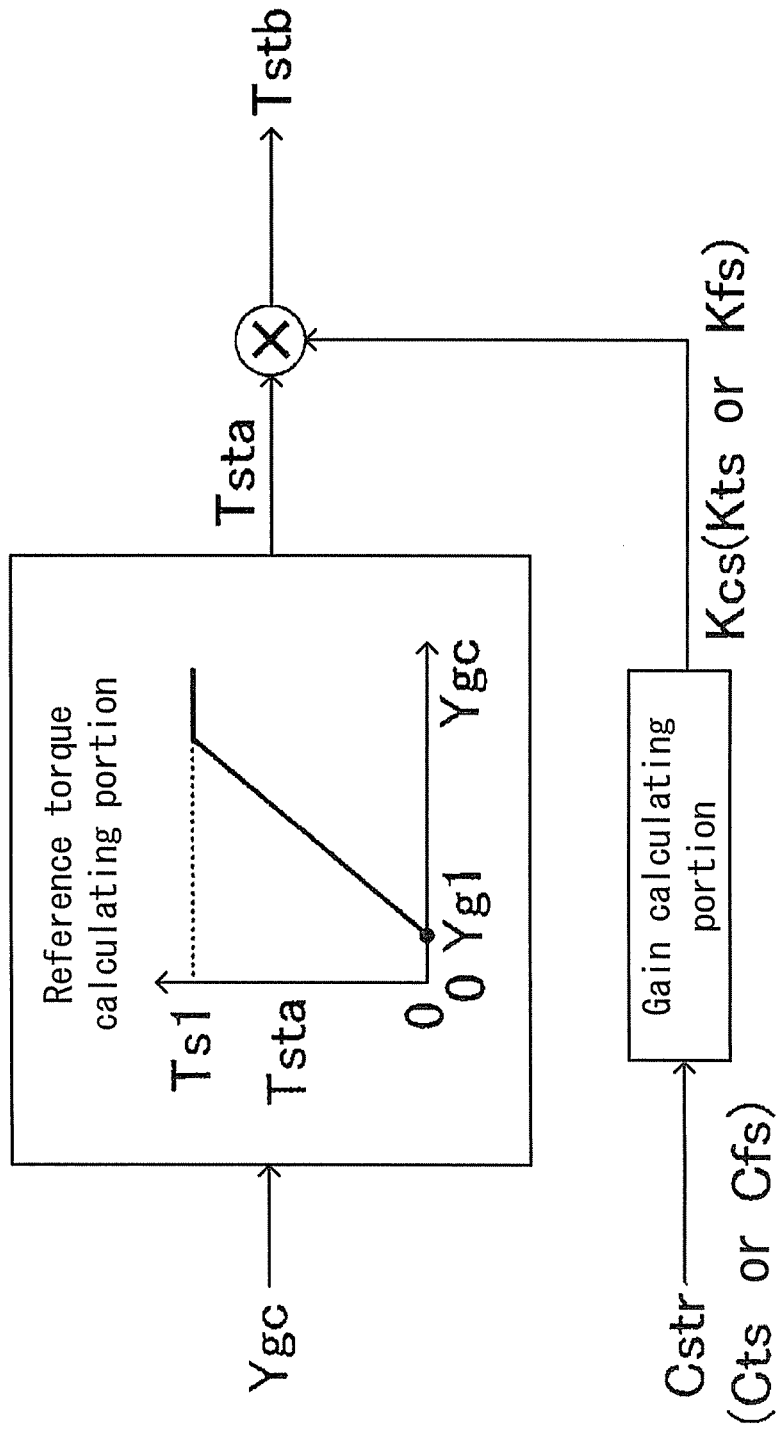
FIG. 8 is a functional block diagram of when the stabilizing torque is calculated by the stabilizing torque calculating means illustrated in FIG. 2.

Alternatively, the stabilizing torque Tstb may be calculated as illustrated in FIG. 8. In this case, firstly, a stabilizing torque Tsta, which serves as a reference, (which will be hereinafter referred to as a reference torque Tsta, which is limited to equal to or less than a limit value Tsl) is calculated at a reference torque calculating portion on the basis of the yawing value Ygc so as to follow a characteristic illustrated in FIG. 8. The characteristic of the reference torque Tsta illustrated in FIG. 8 has the same characteristic corresponding to when the counter-steer attained value Cts becomes the minimum (or, when the counter-steer deficient value Cfs becomes the maximum) in the characteristic of the stabilizing torque Tstb illustrated in FIG. 7 (i.e. the characteristic of when the stabilizing torque Tstb becomes the maximum). As is the case with the stabilizing torque Tstb, the reference torque Tsta is a value of the counter-steering direction (i.e. a value of directing to steer the steered wheels in the counter-steering direction).

Secondly, a gain Kcs (a gain Kts corresponding to the counter-steer attained value Cts or a gain Kfs corresponding to the counter-steer deficient value Cfs) is calculated at a gain calculating portion on the basis of the counter-steer value Cstr.

Figure 9:
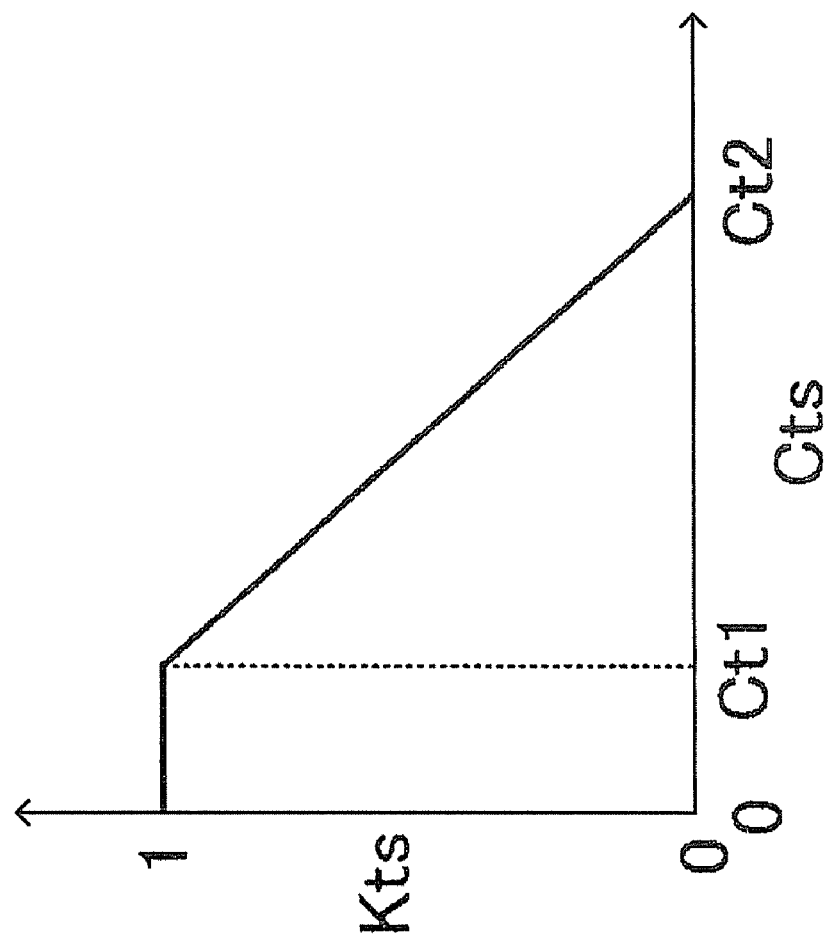
FIG. 9 is a graph illustrating a table, which is referred to by a gain calculating portion illustrated in FIG. 8 and specifies a relationship between a counter-steer attained value and a gain corresponding to the counter-steer attained value.

The gain Kts is calculated by following a characteristic illustrated in FIG. 9. Accordingly, in a case where the counter-steer attained value Cts is equal to or less than a predetermined value Ct1 (i.e. in the case where the driver does not perform the counter-steering operation or in a case where the counter-steering operation by the driver is not sufficient even if the driver performs the counter-steering operation), the gain Kts is calculated to one (1). On the other hand, in a case where the counter-steering attained value Cts is greater than the predetermined value Ct1 and less than a predetermined value Ct2, the gain Kts is calculated so as to decrease from one (1) in response to an increase of the counter-steer attained value Cts from the predetermined value Ct1. Further, in a case where the counter-steer attained value Cts is equal to or greater than the predetermined value Ct2 (i.e. in the case where the driver performs the appropriate and sufficient counter-steering operation), the gain Kts is calculated to zero (0).

Figure 10:
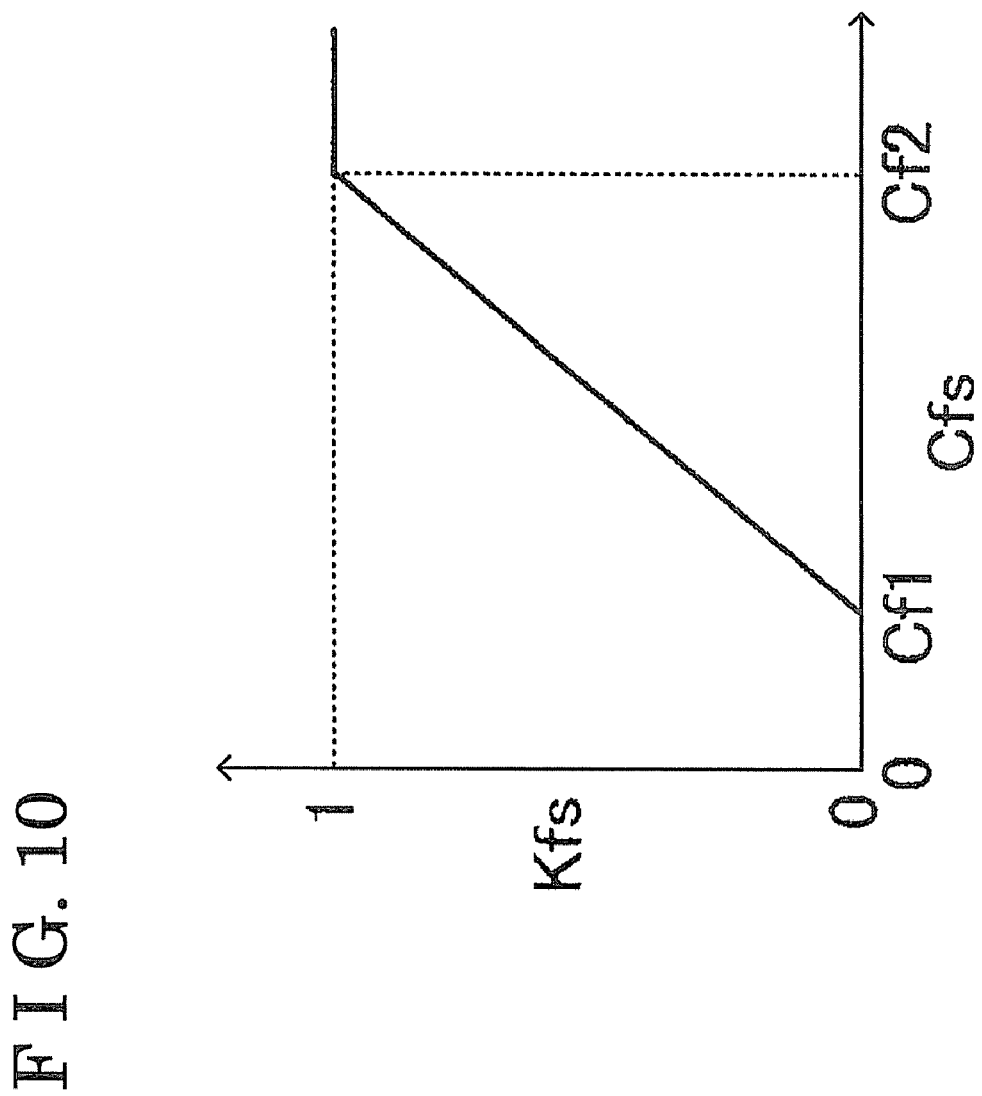
FIG. 10 is a graph illustrating a table, which is referred to by the gain calculating portion illustrated in FIG. 8 and specifies a relationship between the counter-steer deficient value and a gain corresponding to the counter-steer deficient value.

The gain Kfs is calculated by following a characteristic illustrated in FIG. 10. Accordingly, in a case where the counter-steer deficient value Cfs is equal to or less than a predetermined value Cf1 (i.e. in the case where the driver performs the appropriate and sufficient counter-steering operation), the gain Kfs is calculated to zero (0). On the other hand, in a case where the counter-steer deficient value Cfs is greater than the predetermined value Cf1 and less than a predetermined value Cf2, the gain Kfs is calculated so as to increase from zero (0) in response to an increase of the counter-steer deficient value Cfs from the predetermined value Cf1. Further, in a case where the counter-steer deficient value Cfs is equal to or greater than the predetermined value Cf2 (i.e. in the case where the driver does nor perform the counter-steering operation or in the case where the counter-steering operation by the driver is not sufficient even if the counter-steering operation is performed), the gain Kfs is calculated to one (1).

Then, the stabilizing torque Tstb is calculated by multiplying the reference torque Tsta by the gain Kcs (the gain Kts or the gain Kfs). Accordingly, the stabilizing torque Tstb is calculated by modifying the reference torque, which is obtained by the reference torque characteristic relative to the yawing value and corresponding to the characteristic of when the counter-steer attained value Cts becomes the minimum (or, the counter-steer deficient value Cfs becomes the maximum), in the direction of reducing the reference torque Tsta on the basis of the counter-steer value Cstr. Hence, as is the case where the stabilizing torque Tstb is calculated by following the characteristic illustrated in FIG. 7, the greater the counter-steer attained value Cts is (or, the smaller the counter-steer deficient value Cfs is), the smaller value the stabilizing torque Tstb is calculated to be.

Alternatively, the stabilizing torque Tstb may be calculated by modifying the reference torque Tsta, which is obtained from the reference torque characteristic relative to the yawing value and corresponding to the characteristic of when the counter-steer attained value Cts becomes the maximum (or, the counter-steer deficient value Cfs becomes the minimum), in the direction of increasing the reference torque Tsta on the basis of the counter-steer value Cstr. Alternatively, the stabilizing torque Tstb may be calculated by modifying the reference torque Tsta, which is obtained from the reference torque characteristic relative to the yawing value and corresponding to a characteristic of when the counter-steer value Cstr reaches a predetermined reference value, in the direction of increasing the reference torque Tsta or in the direction of reducing the reference torque Tsta on the basis of the counter-steer value Cstr.

Figure 11:
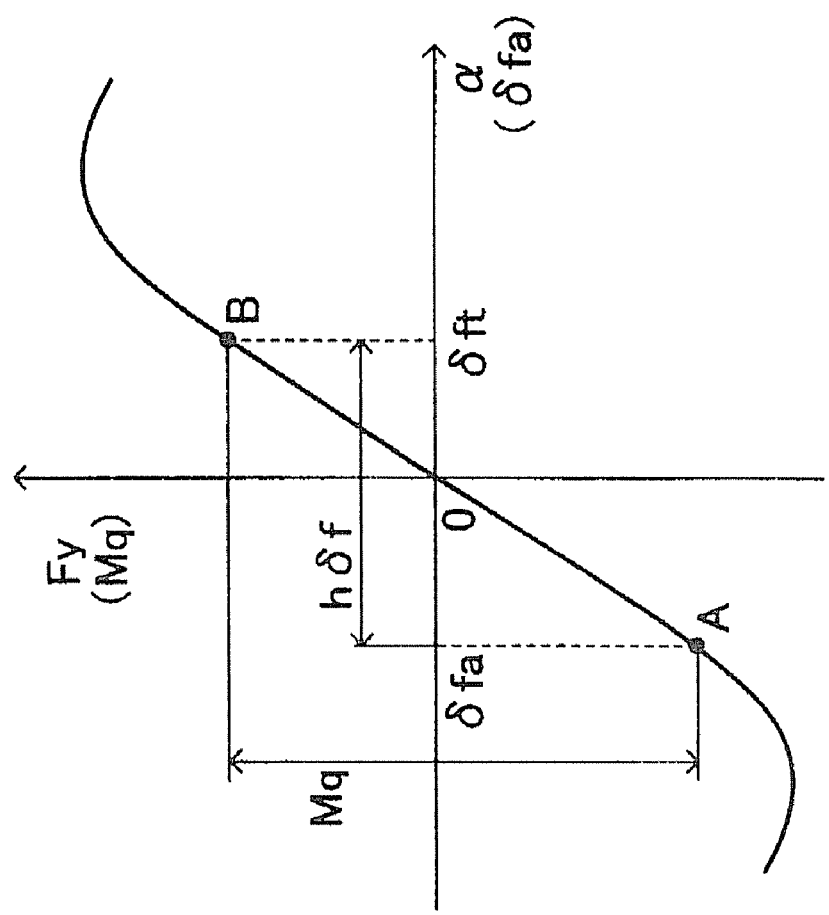
FIG. 11 is a graph illustrating a tire characteristic (i.e. a relationship between a slip angle and a lateral force of a steered wheel)

An operation (actuation) of the steering control device of the first embodiment will be described bellow with reference to FIG. 11 and the like. Illustrated in FIG. 11 is a general tire characteristic (a relationship between a slip angle a and a lateral force Fy of the steered wheels). The slip angle a of the steered wheels has a certain relationship relative to the actual steering angle $\delta fa$ (or, the target steering angle $\delta ft$). Further, the lateral force Fy of the steered wheels has a certain relationship relative to the stabilizing yawing moment Mq. Accordingly, the operation of the steering control device of the first embodiment is explained as follows by using the characteristic illustrated in FIG. 11 by considering that a horizontal axis also represents the actual steering angle $\delta fa$ (the target steering angle δft) and a vertical axis also represents the stabilizing yawing moment Mq in the tire characteristic illustrated in FIG. 11. Additionally, in this embodiment, a first quadrant (an upper right region) corresponds to the state where the vehicle turns left, and a third quadrant (a lower left region) corresponds to the state where the vehicle turns right in the characteristic illustrated in FIG. 11.

Figure 12:
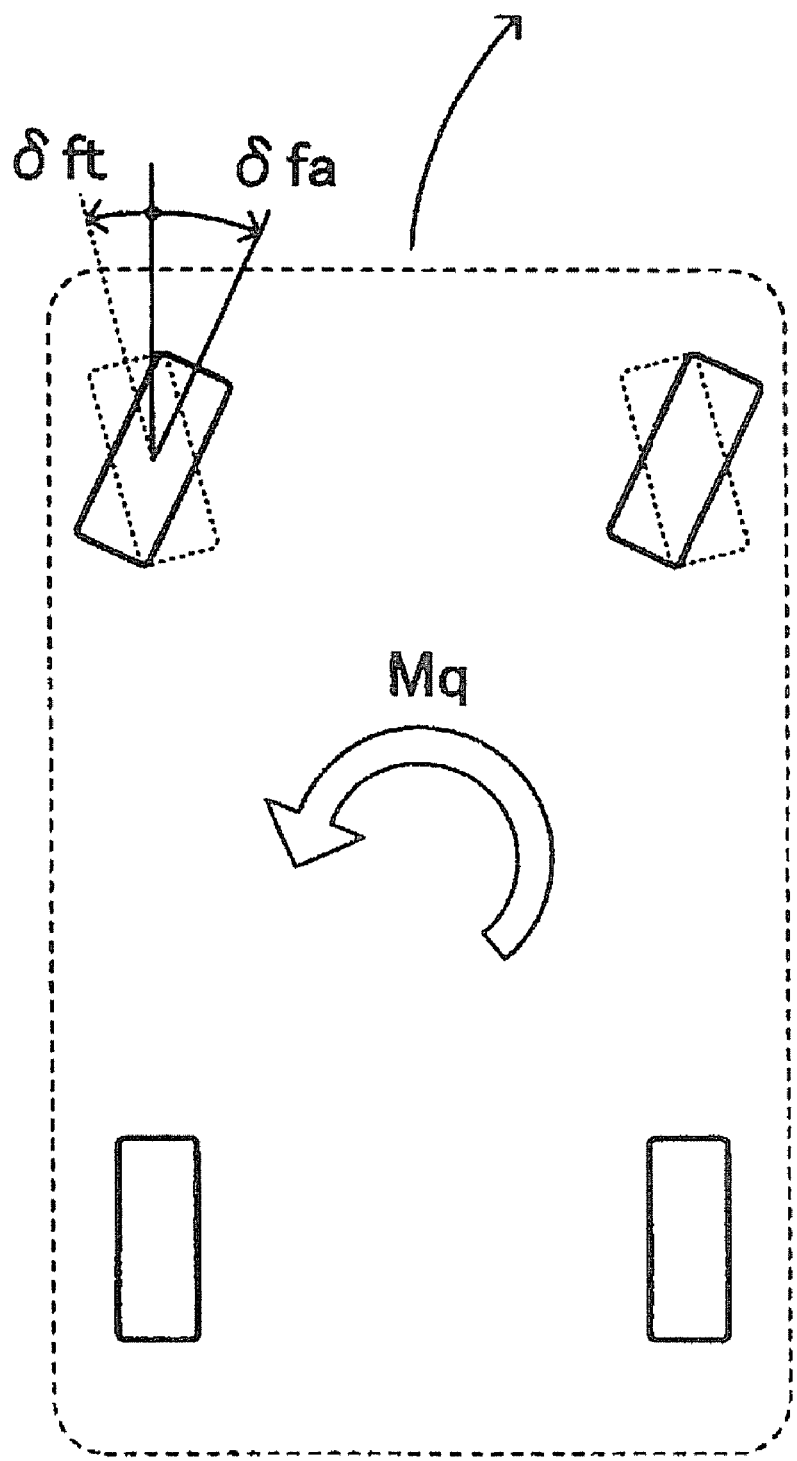
FIG. 12 is a graph illustrating an example of a relationship between a counter-steer and a stabilizing yawing moment.

In a case where an excessive oversteer occurs at the vehicle, the counter-steering operation needs to be performed so as to generate the stabilizing yawing moment Mq for stabilizing the vehicle in order to ensure the stability of the vehicle. For example, as illustrated in FIG. 12, in a case where the oversteer occurs at the vehicle while turning right (while the vehicle is turning in the clockwise direction when viewed from above), the counter-steering operation needs to be performed in the left-turn direction (i.e. in the counterclockwise direction of the steering wheel SW when viewed from the driver) in order to generate the stabilizing moment Mq in the left-turn direction (i.e. in the counterclockwise direction when viewed from above the vehicle) (see FIG. 12).

A case where the counter-steer attained value Cts is used as the counter-steer value Cstr in the above-mentioned state will be considered below. In this case, the actual steering angle δfa of when the front wheels WHfr and WHfl are steered in the counter-steering direction (the direction opposite to the yawing motion direction, i.e. in the left-turn direction in FIG. 12) by the driver performing the counter-steering operation is calculated as the counter-steer attained value Cts. In other words, the steering angle δfa existing in the first quadrant in FIG. 11 is calculated as the counter-steer attained value Cts. Then, the stabilizing torque Tstb, which is determined on the basis of the yawing value Ygc (i.e. the oversteer state quantity Jros) and the counter-steer attained value Cts, is applied to the steering wheel SW in the left-turn direction (i.e. in the counterclockwise direction when viewed from the driver, in the direction of steering the steered wheels to the left) (see e.g. FIG. 7).

Secondly, a case where the counter-steer deficient value Cfs is used as the counter-steer value Cstr will be described below. In this case, it is assumed that the front-wheel steering angle needs to reach the target steering angle δft, which corresponds to a point B, by performing the counter-steering operation in order to generate the stabilizing moment Mq in the left-turn direction. However, if the front wheel steering angle is found to correspond to the actual steering angle δfa, which corresponds to a point A, because the driver does not perform the counter-steering operation or because the counter-steering operation by the driver is not sufficient, the steering angle deviation hδf (=δft−δfa) is calculated as the counter-steer deficient value Cfs. Then, the stabilizing torque Tstb, which is determined on the basis of the yawing value Ygc (i.e. the oversteer state quantity Jros) and the counter-steer deficient value Cfs, is applied to the steering wheel SW in the left-turn direction (i.e. in the counterclockwise direction when viewed from the driver, in the direction of steering the steered wheels to the left) (see e.g. FIG. 7).

Figure 13:
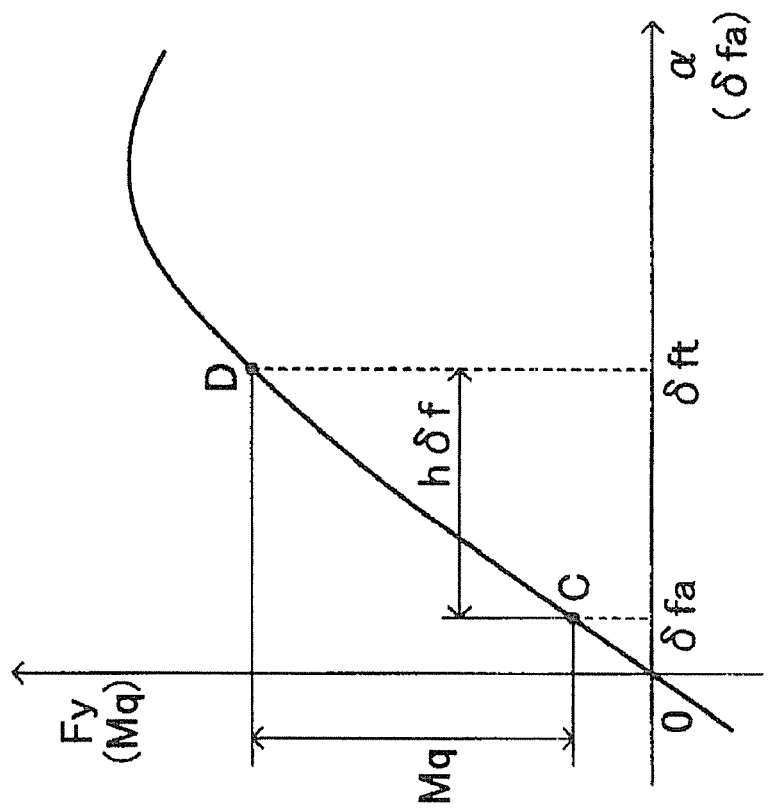
FIG. 13 is a graph illustrating a tire characteristic (i.e. the slip angle and the lateral force of the steered wheel) while the vehicle travels straight.
Figure 14:
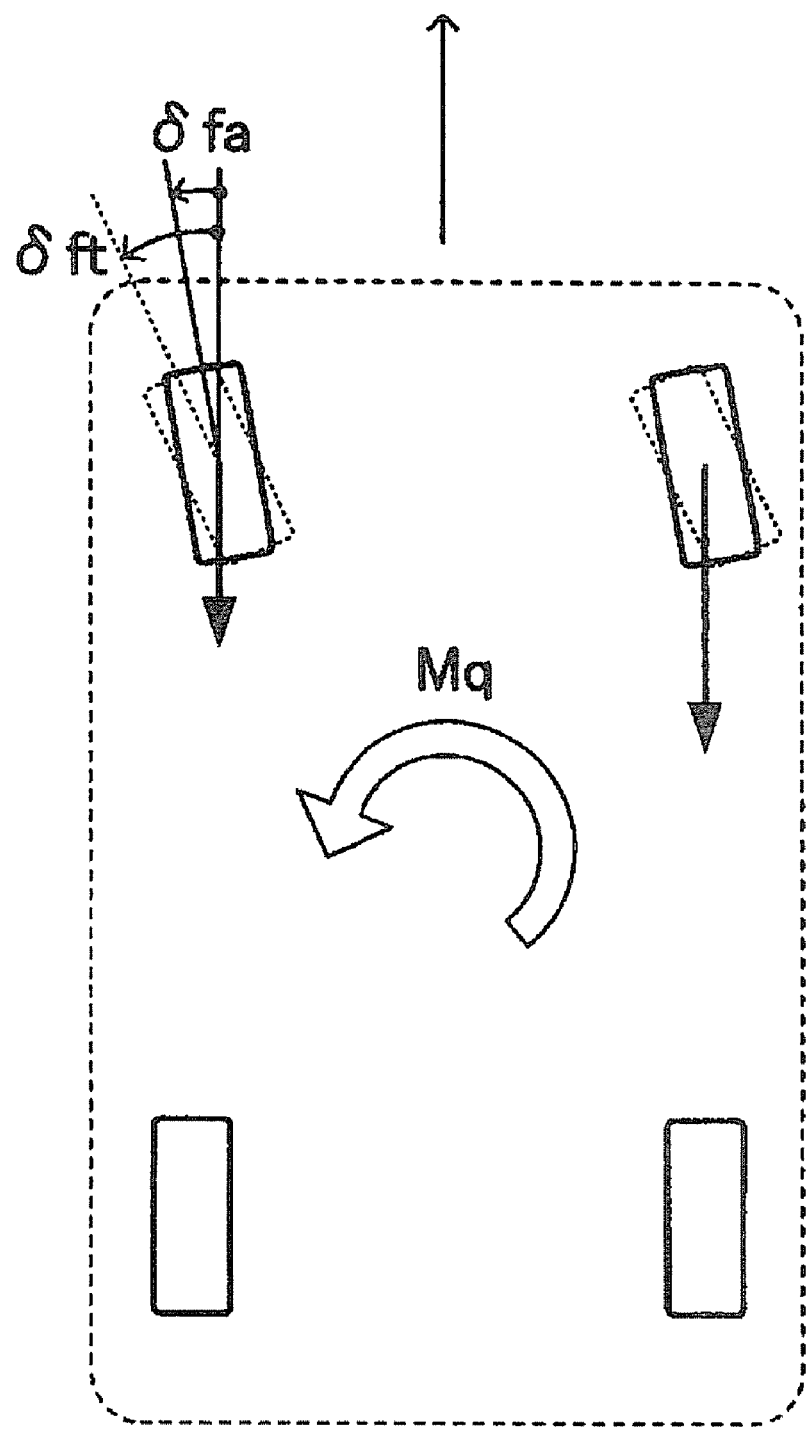
FIG. 14 is a graph illustrating an example of a relationship between the counter-steer and the stabilizing yawing moment while the vehicle travels straight.

A case where the ABS control is executed while the vehicle is traveling straight on the μ split road will be described below with reference to FIG. 13, which corresponds to FIG. 11. In this case, in order to restrict the deflection of the vehicle caused due to the difference of the braking force between the right and left wheels, the counter-steering operation needs to be performed in order to generate the stabilizing yawing moment Mq for stabilizing the vehicle. For example, as illustrated in FIG. 14, in a case where the ABS control is executed while the vehicle is traveling straight on the road surface having the low friction coefficient at the left side of the vehicle and the high friction coefficient at the right side of the vehicle, the vehicle deflects in the right-turn direction because of the difference of the braking force between the right and left wheels. In this case, in order to ensure the stability of the vehicle, the counter-steering operation needs to be performed in the left-turn direction in order to generate the stabilizing moment Mq in the left-turn direction for counterbalancing the yawing moment generated in the right-turn direction due to the difference of the braking force between the right and left wheels (see FIG. 14).

The case where the counter-steer attained value Cts is used as the counter-steer value Cstr in the above-described case will be described below. In this case, the actual steering angle δfa of when the front wheels WHfl and WHfr being steered in the counter-steering direction (the direction opposite to the yawing motion direction, i.e. in the left-turn direction in FIG. 14) by the driver performing the counter-steering operation is calculated as the counter-steer attained value Cts. In other words, the steering angle δfa existing in first quadrant in FIG. 13 is calculated as the counter-steer attained value Cts. Then, the stabilizing torque Tstb, which is determined on the basis of the yawing value Ygc (=the longitudinal force difference hFx) and the counter-steer attained value Cts, is applied to the steering wheel SW in the left-turn direction (i.e. the counterclockwise direction when viewed from the driver, the direction of steering the steered wheels to the left) (see e.g. FIG. 7).

The case where the counter-steer deficient value Cfs is used as the counter-steer value Cstr will be described below. In this case, it is assumed that the front wheel steering angle needs to reach the target steering angle δft, which corresponds to a point D, by performing the counter-steering operation in order to generate the stabilizing moment Mq in the left-turn direction. However, if the front wheel steering angle is found to correspond to the actual steering angle δfa, which corresponds to a point C, because the driver does not perform the counter-steering operation or the counter-steering operation by the driver is not sufficient, the steering deviation hδf (=δft−δfa) is calculated as the counter-steer deficient value Cfs. Then, the stabilizing torque Tstb, which is determined on the basis of the yawing value Ygc (=longitudinal force difference hFx) and the counter-steer deficient value Cfs, is applied to the steering wheel SW in the left-turn direction (i.e. the counterclockwise direction when viewed from the driver, the direction of steering the steered wheels to the left) (see e.g. FIG. 7).

According to the steering control device of the first embodiment, the steering torque control (the application of the stabilizing torque Tstb) is executed as the oversteer restricting control. In the steering torque control, the EPS torque Teps for reducing the steering torque is calculated on the basis of the steering torque Tsw generated by the driver. Further, the stabilizing torque Tstb for assisting (inducing) the counter-steering operation is calculated on the basis of the yawing value Ygc corresponding to the yawing motion of the vehicle (the oversteer state quantity Jros, the longitudinal force difference hFx) and the counter-steer value indicating the degree of the counter-steer (the counter-steer attained value Cts, the counter-steer deficient value Cfs). Then, the torque Teps in the direction of reducing the steering torque Tsw generated by the driver and the torque Tstb in the counter-steering direction are applied to the steering wheel SW. Accordingly, the counter-steering operation by the driver is induced or assisted by the stabilizing torque Tstb.

In the case where the counter-steer attained value Cts is small (or, in the case where the counter-steer deficient value Cfs is great), i.e. in the case where the driver does not perform the appropriate counter-steering operation, the stabilizing torque Tstb is set to be a greater value. As a result, the counter-steering operation is appropriately and sufficiently assisted (induced) by the greater stabilizing torque Tstb for the driver who is not skilled. On the other hand, in the case where the counter-steer attained value Cts is great (or, in the case where the counter-steer deficient value Cfs is small), i.e. in the case where the driver performs the appropriate counter-steering operation while predicting the behavior of the vehicle, the stabilizing torque Tstb is set to be a smaller value. As a result, the sense of discomfort the skilled driver feels, that the steering force during the counter-steering operation is reduced in contrary to his/her expectation, is prevented.

[Second Embodiment]

A steering control device according to a second embodiment will be described below. The steering control device of the second embodiment differs from the steering control device of the first embodiment, in which the stabilizing torque Tstb is adjusted on the basis of the counter-steer value Cstr, in that the application of the stabilizing torque Tstb is not executed in a case where the steering control device of the second embodiment determines that the counter-steering operation is performed. Hence, the differences between the first and second embodiments will be mainly described below.

Figure 15:
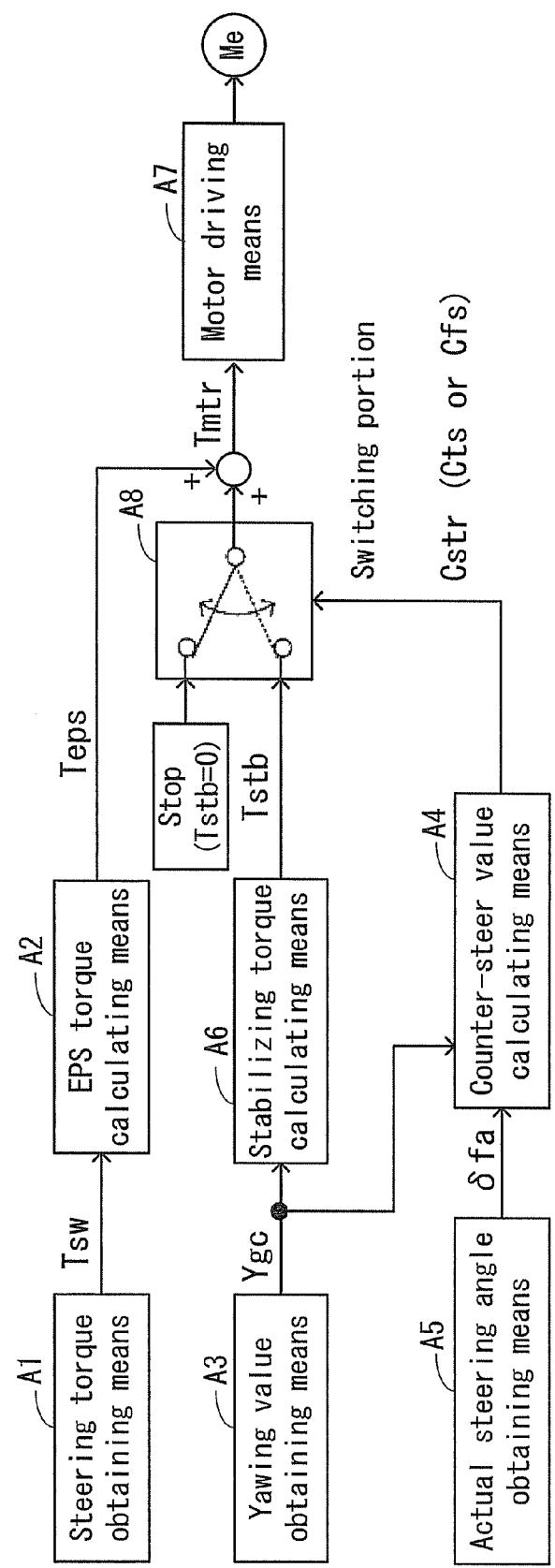
FIG. 15 is a functional block diagram of when the oversteer restricting control is executed by a steering control device relating to a second embodiment.

Illustrated in FIG. 15 is a functional block diagram of when the oversteer restricting control is executed by the steering control device relating to the second embodiment. As illustrated in FIG. 15, a switching means A8 (the force applying means) is added to the steering control device of the second embodiment, comparing to the first embodiment (see FIG. 2). Further, the stabilizing torque Tstb is calculated at the stabilizing torque calculating means A6 on the basis only of the yawing value Ygc without using the counter-steer value Cstr.

Figure 16:
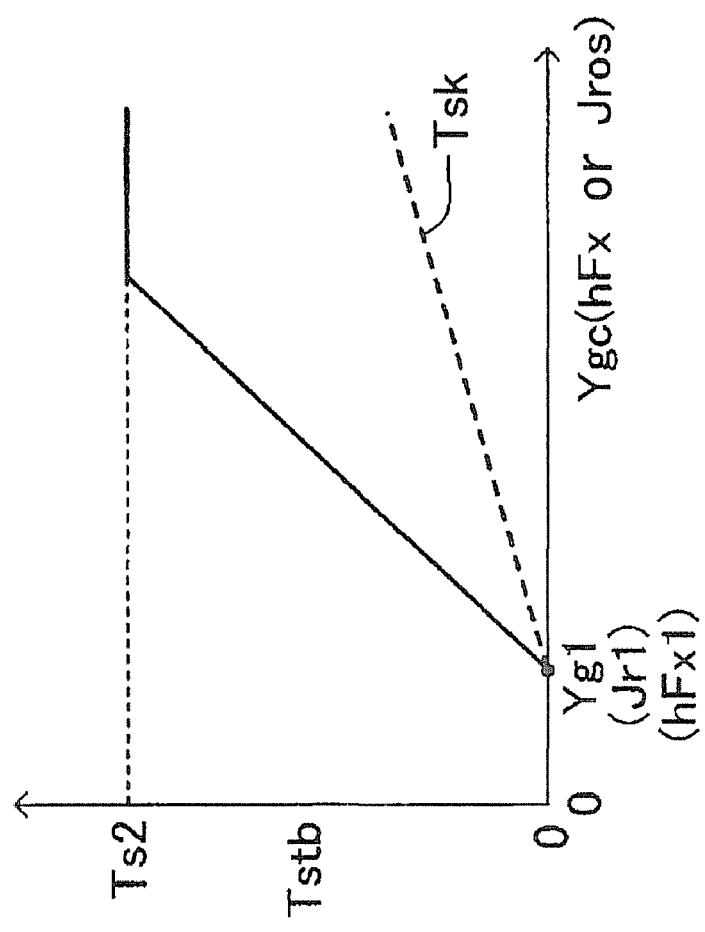
FIG. 16 is a graph illustrating a table, which is referred to by a stabilizing torque calculating means illustrated in FIG. 15 and specifies a relationship between the yawing value and the stabilizing torque.

More specifically, the stabilizing torque Tstb is calculated by following a characteristic illustrated in FIG. 16 on the basis of the yawing value Ygc (the oversteer state quantity Jros or the longitudinal force difference hFx) at the stabilizing torque calculating means A6. The characteristic of the stabilizing torque Tstb illustrated in FIG. 16 has the same characteristic as the reference torque Tsta illustrated in FIG. 8 (i.e. the characteristic corresponding to when the counter-steer attained value Cts becomes the minimum (or, the counter-steer deficient value Cfs becomes the maximum) in the characteristic of the stabilizing torque Tstb illustrated in FIG. 7 (i.e. the characteristic of when the stabilizing torque Tstb becomes the maximum)).

At the switching means A8, it is determined whether or not the counter-steering operation of the steering wheel SW is performed by the driver on the basis of the counter-steer value Cstr. More specifically, in a case where the counter-steer attained value Cts is greater than a predetermined value, or in a case where the counter-steer deficient value Cfs is smaller than a predetermined value, it is determined that the counter-steering operation is performed.

In the case where it is determined that the counter-steering operation is performed, the switching means A8 does not output the stabilizing torque Tstb (Tstb=0 (Stop)) to the motor driving means A7. On the other hand, in the case where it is determined that the counter-steering operation is not performed, the switching means A8 outputs the stabilizing torque Tstb to the motor driving means A7.

According to the steering control device relating to the second embodiment, in the case where the skilled driver appropriately performs the counter-steering operation while predicting the behavior of the vehicle, it is determined that the counter-steering operation is performed, thereby not applying the stabilizing torque Tstb to the steering wheel SW. Accordingly, the sense of discomfort the skilled driver feels, that the steering force during the counter-steering operation is reduced in contrary to his/her expectation, is restricted. On the other hand, in the case where the driver does not perform the counter-steering operation, it is determined that the counter-steering operation is not performed, thereby applying the appropriate degree of the stabilizing force. Accordingly, the counter-steering operation is appropriately and sufficiently induced or assisted for the driver, who is not skilled, by the appropriate degree of the stabilizing force.

[Third Embodiment]

A steering control device relating to a third embodiment will be described below. The steering control device of the third embodiment differs from the steering control device of the first and second embodiments, in that a braking force control (an application of the braking force to a turning outer front wheel) is executed as the oversteer restricting control in addition to the steering torque control (the application of the stabilizing torque Tstb) of the first and second embodiments. Hence, the differences between the steering control device of the third embodiment and the steering control device of the first and second embodiments will be mainly described below.

Figure 17:
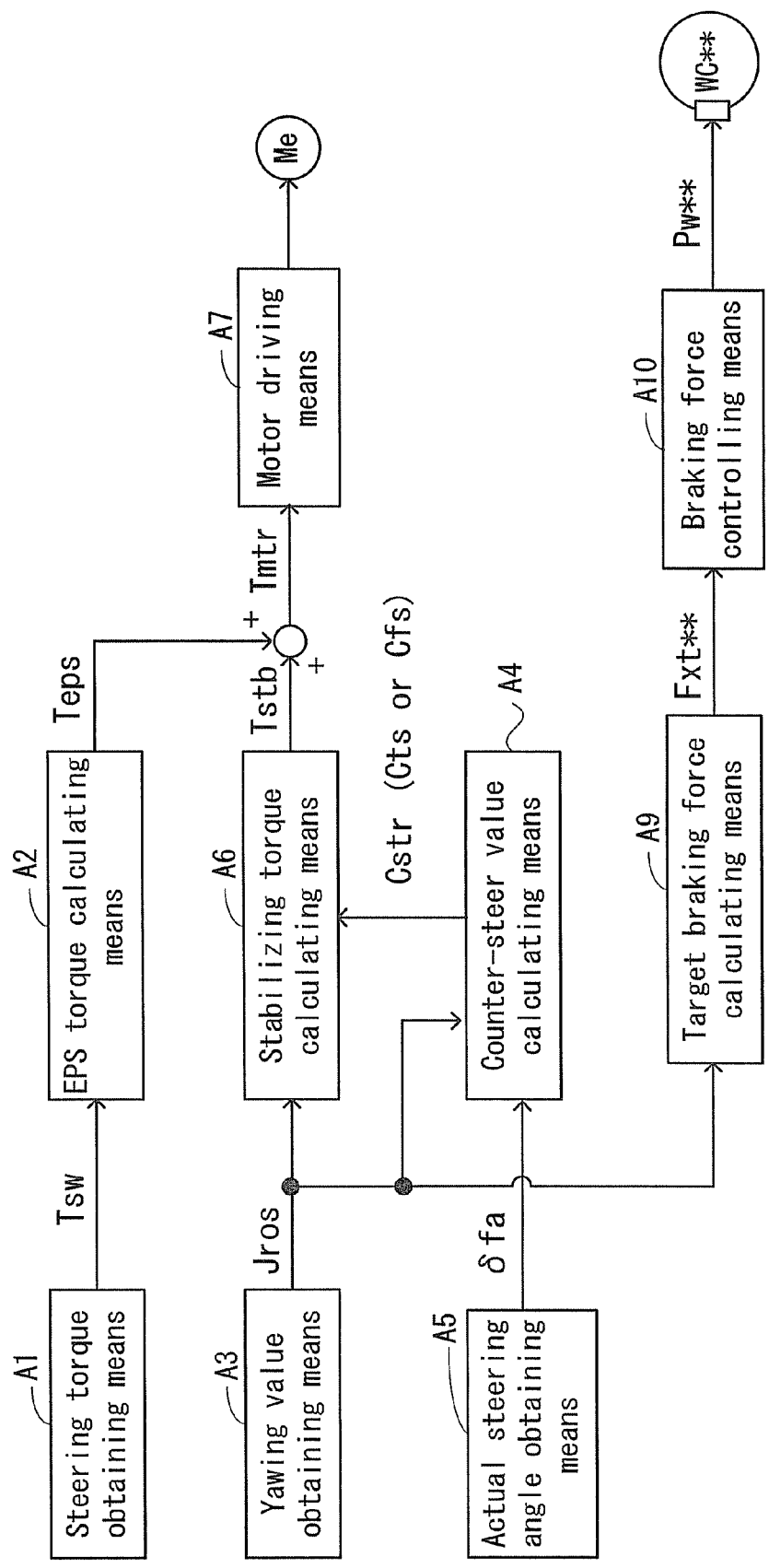
FIG. 17 is a functional block diagram of when the oversteer restricting control is executed by a steering control device relating to a third embodiment.

Illustrated in FIG. 17 is a functional block diagram of when the oversteer restricting control is executed by the steering control device according to the third embodiment. As illustrated in FIG. 17, the steering control device of the third embodiment further includes a target braking force calculating means A9 (a braking force calculating means) and a braking force controlling means A10 when comparing to the steering control device of the first embodiment (see FIG. 2). Accordingly, the braking force control (the ESC control) for restricting the oversteer of the vehicle is executed on the basis of the oversteer state quantity Jros.

Additionally, the oversteer state quantity Jros is obtained as the yawing value Ygc. Accordingly, as shown in FIG. 7, the application of the stabilizing torque Tstb in the steering torque control is started under a condition where the oversteer state quantity Jros being greater than the threshold value Jrl (i.e. Jros>Jrl), which is set as a starting condition.

Figure 18:
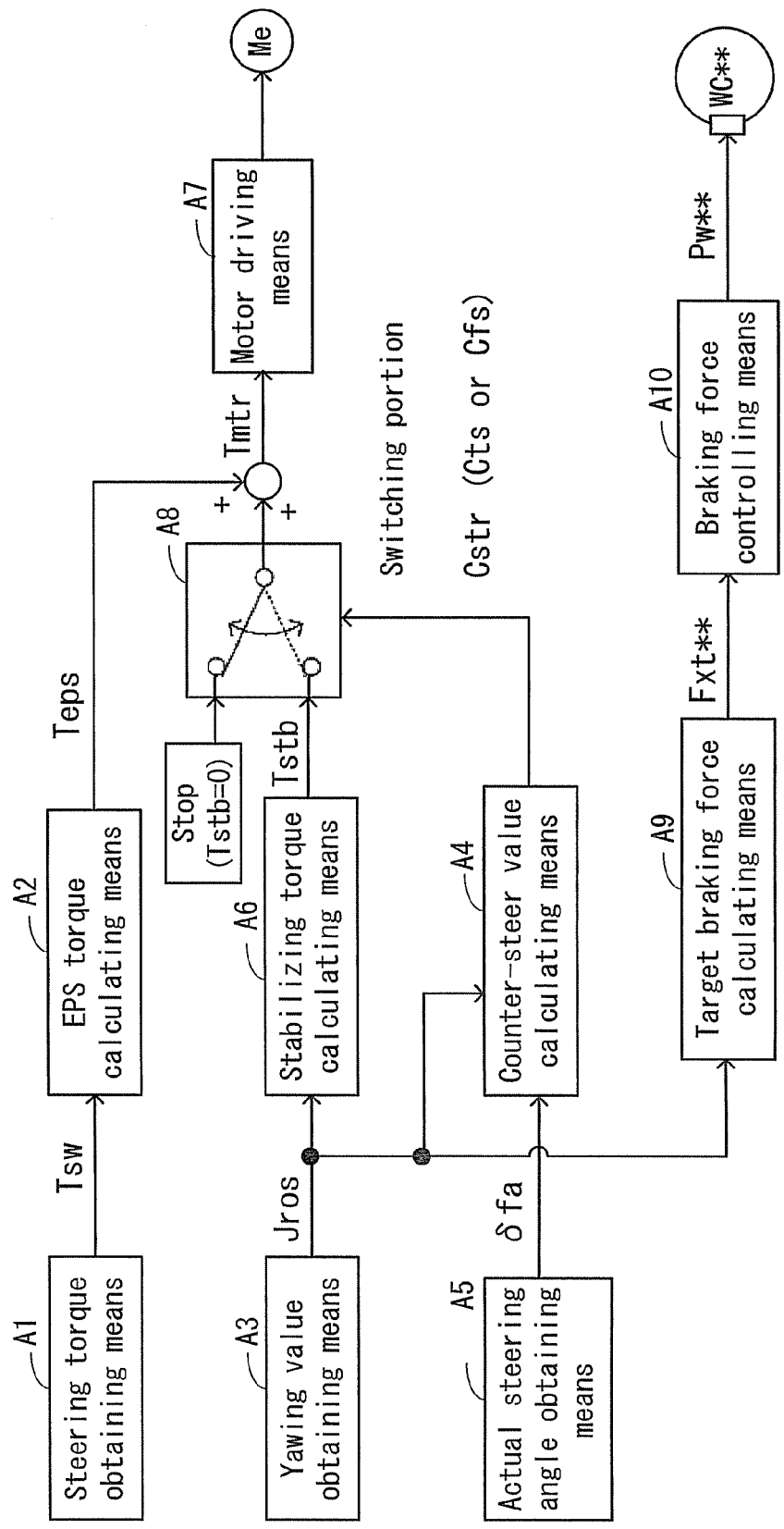
FIG. 18 is a functional block diagram of when the oversteer restricting control is executed by a steering control device relating to a modified example of the third embodiment.

Further, as illustrated in FIG. 18, the steering control device of the third embodiment may be modified so as to additionally include the target braking force calculating means A9 and the braking force controlling means A10, comparing to the steering control device of the second embodiment (see FIG. 15), so that the oversteer state quantity Jros is obtained as the yawing value Ygc. Even in this case, as shown in FIG. 16, the application of the stabilizing torque Tstb is started under the condition where the oversteer state quantity Jros being greater than the threshold value Jrl (i.e. Jros>Jrl), which is set as the starting condition.

Figure 19:
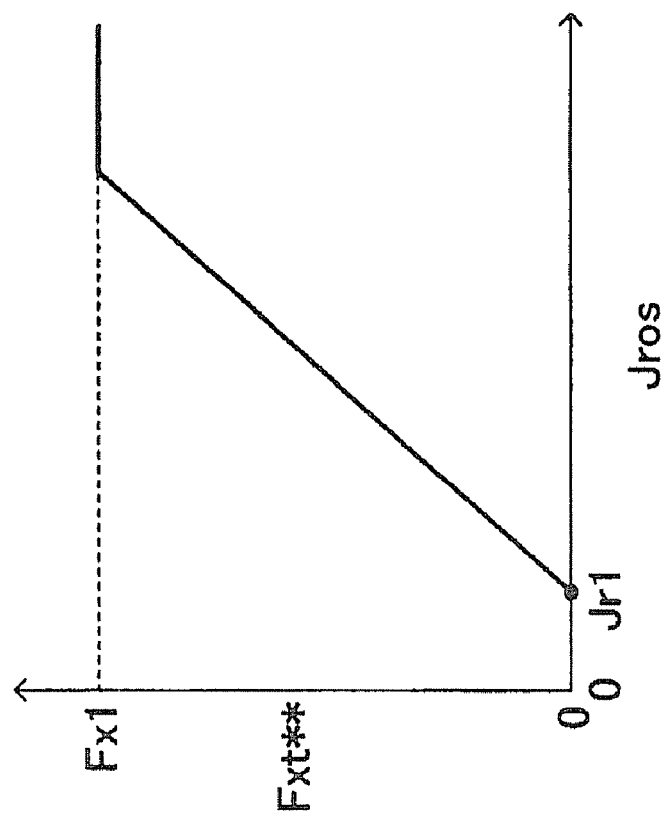
FIG. 19 is a graph illustrating a table specifying a relationship between the oversteer state quantity and a target braking force.

At the target baking force calculating means A9, a target value of the braking force of each wheel (a target braking force Fxt) is calculated by following a characteristic illustrated in FIG. 19 on the basis of the oversteer state quantity Jros. Accordingly, the target braking force Fxt is calculated to zero (0) in the case where the oversteer state quantity Jros is equal to or less than the threshold value Jrl. On the other hand, in the case where the oversteer state quantity Jros is greater than the threshold value Jrl, the target braking force Fxt** is calculated so as to increase from zero (0) in response to the increased of the oversteer state quantity Jros from the threshold value Jrl. However, the target braking force Fxt* * is limited to equal to or less than a value Fxl.

At the braking force controlling means A10, the brake actuator BRK is driven on the basis of the target braking force Fxt* *. Accordingly, the braking force of each wheel is adjusted so as to correspond to the target braking force Fxt**. As a result, the braking force of the turning outer front wheel is increased independently of the operation of the brake pedal BP by the driver.

Accordingly, the braking force control is executed on the basis of the oversteer state quantity Jros under the condition where the oversteer state quantity Jros being greater than the threshold value Jrl (i.e. Jros>Jrl), which is set as the starting condition. In the third embodiment, the oversteer is also restricted by the braking force control in addition to the application of the stabilizing torque Tstb in the steering torque control described in the first and second embodiments.

Figure 20:
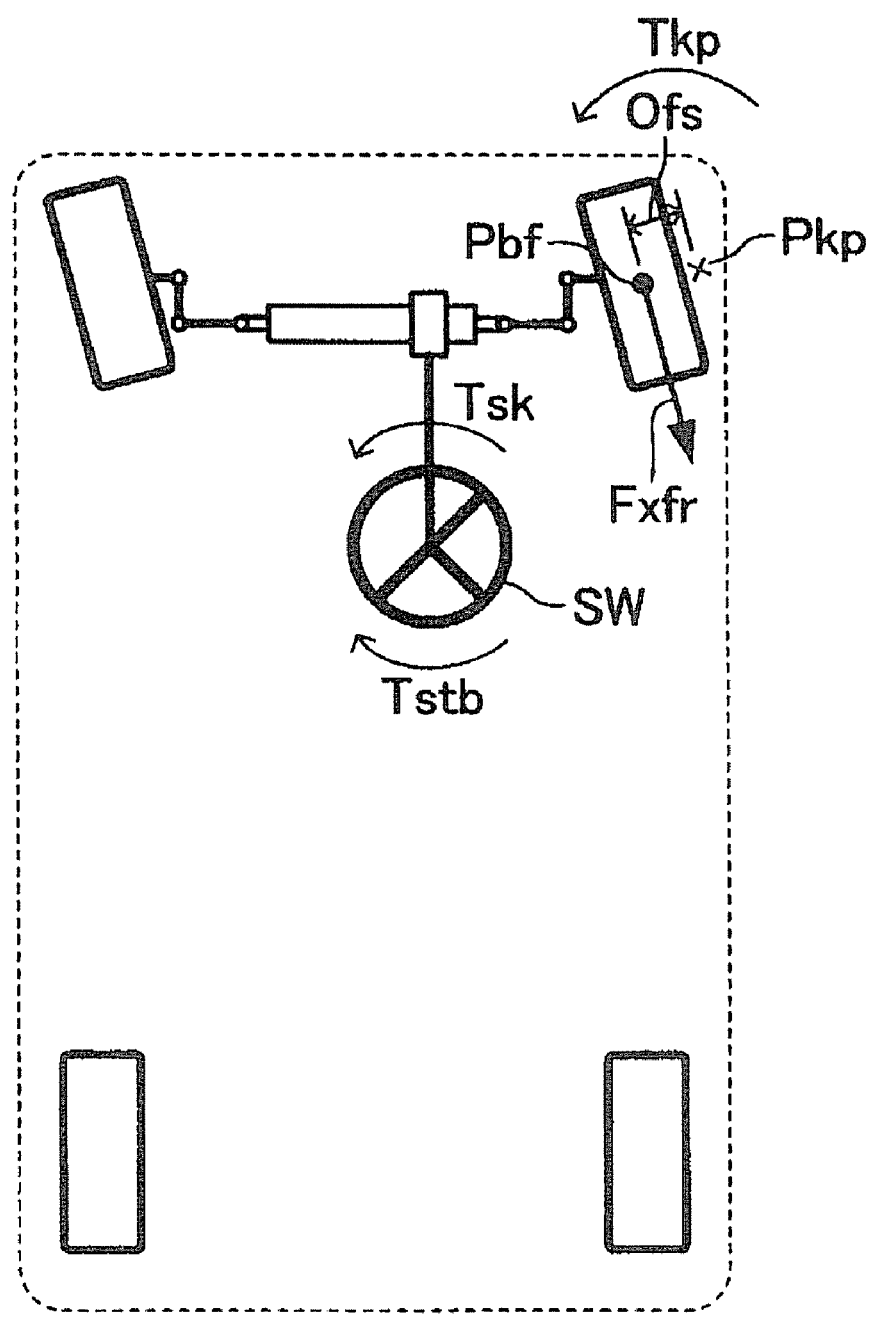
FIG. 20 is a diagram for explaining a "torque steer" generated at the vehicle in which a negative kingpin offset is adapted to the steered wheel.

A case where a negative kingpin offset is adapted to the steered wheels (the front wheels) of the vehicle as illustrated in FIG. 20 will be considered below. The negative kingpin offset indicates a case where an intersection point Pkp of a center axis of a kingpin (i.e. an intersection point Pkp at which the center axis of the kingpin intersects with the road surface) is positioned at an outer side in a vehicle width direction (in the lateral direction of the vehicle body) relative to a load application point Pbf of the longitudinal force (Fxfr) (i.e. a point Pbf at which the longitudinal force (Fxfr) is applied).

When the braking force is applied to the steered wheels of the vehicle to which the negative kingpin offset is adapted to the steered wheels, a torque of steering the steered wheels in response to the braking force is generated due to an existence of a distance Ofs (the kingpin offset) between the application point Pbf of the braking force and the intersection point Pkp of the center axis of the kingpin. This phenomenon is also called as a "torque steer".

For example, as illustrated in FIG. 20, in the case where the braking force Fxfr is applied to the turning outer front wheel WHfr by the above-described braking force control (the ESC control) when the oversteer occurs at the vehicle while turning left, a torque Tkp (a force), which is calculated by multiplying the distance Ofs by the braking force Fxfr (i.e. Tkp=Ofs·Fxfr) and which steers the front wheels in the left-turn direction, acts on the front wheels because of the torque steer. The torque Tkp acts on the steering wheel SW as a torque for rotating the steering wheel SW in the left-turn direction (the counterclockwise direction when viewed from the driver) (i.e. a torque steer induced torque Tsk).

On the other hand, in this case, the stabilizing torque Tstb is applied to the steering wheel SW in the right-turn direction (i.e. in the clockwise direction when viewed from the driver), because the counter-steering direction is the right-turn direction.

Accordingly, if either one of the "application of the braking force to the turning outer front wheel" or the "application of the stabilizing torque Tstb" is started earlier than the other (i.e. if the "application of the braking force to the turning outer front wheel" and the "application of the stabilizing torque Tstb" are not simultaneously started) in an increasing process of the oversteer state quantity Jros while the vehicle is in the oversteer state, the driver may feel the torque steer induced torque Tsk which is generated due to the "application of the braking force to the turning outer front wheel", which may result in causing discomfort for the driver.

On the other hand, in the third embodiment, the starting condition of the "application of the braking force to the turning outer front wheel" and the starting condition of the "application of the stabilizing torque Tstb" are set to be the same (i.e. oversteer state quantity Jros>threshold value Jrl). Accordingly, in the increasing process of the oversteer state quantity Jros while the vehicle is in the oversteer state, the "application of the braking force to the turning outer front wheel" and the "application of the stabilizing torque Tstb" are simultaneously started. As a result, the driver is less likely to feel "the torque steer induced torque Tsk" which is generated due to the "application of the braking force to the turning outer front wheel", therefore, the application of the stabilizing torque Tstb is executed without causing discomfort to the driver.

Further, "the torque steer induced torque Tsk", which is generated due to the "application of the braking force to the turning outer front wheel", increases in response to the increase of the oversteer state quantity Jros because the braking force applied to the steered wheels increases in response to the increase of the oversteer state quantity Jros. The characteristics indicated by dashed line in FIGS. 7 and 16 represent a characteristic of the "torque steer induced torque Tsk" relative to the oversteer state quantity Jros. Additionally, the characteristic of the torque steer induced torque Tsk may be preliminarily obtained through an experiment and the like.

As shown in FIGS. 7 and 16, the stabilizing force Tstb relative to the oversteer state quantity Jros is determined to be a greater value than the torque steer induced force Tsk relative to the oversteer state quantity Jros within the range in which the oversteer state quantity Jros is greater than the threshold value Jrl. Accordingly, in the state where the "application of the braking force to the turning outer front wheel" and the "application of the stabilizing torque Tstb" are both executed (i.e. in the case where the oversteer state quantity Jros is greater than the threshold value Jrl (Jros>Jrl)), the "torque steer induced torque Tsk" is completely absorbed by the stabilizing force Tstb. As a result, the driver is further less likely to feel the "torque steer induced torque Tsk".

The present invention is not limited to the above-described embodiments, but the various modification and changes may be applied to the steering control device without departing from the spirit of the present invention. For example, in the above-described embodiments, the steering wheel SW and the steered wheels WHfl and WHfr are mechanically connected. However, a so-called steer-by-wire system, in which the steering wheel SW and the steered wheels WHfl and WHfr are not mechanically connected, may be adapted. The steer-by-wire system is a mechanism for controlling the front wheel steering angle on the basis of an electric signal indicating the operating angle θsw of the steering wheel SW. In this case, a rod-like portion (a so-called joystick) may be used as the steering operation member instead of the steering wheel SW.

Additionally, in the above-described embodiments, the steering control device is configured so as to drive the electric motor Me on the basis of the target value Tmtr (=Teps+Tstb) for drive-controlling the electric motor Me. However, the steering control device may be modified so as to drive the electric motor Me on the basis of the target value Tmtr (=Tstb) for drive-controlling the electric motor Me. In this case, only the stabilizing torque Tstb is applied to the steering wheel SW in the counter-steering direction. Accordingly, the counter-steering operation by the driver is induced or assisted by the stabilizing torque Tstb.

In the above-described embodiments, the counter-steer value calculating means A4, the actual steering angle obtaining means A5 and the stabilizing torque calculating means A6 serve as a stabilizing force calculating means. Specifically, the counter-steer value calculating means A4 and the actual steering angle obtaining means A5 serve as a counter-steer value calculating means.

The steering control device for the vehicle according to the embodiments includes the yawing value obtaining means (A3), the stabilizing force calculating means (A4, A5, A6)

and the force applying means (A7). Hereinbelow, those means will be explained in this order.

The yawing value obtaining means (A3) obtains the yawing value (Ygc, hFx, Jros), which is a value corresponding to the yawing motion of the vehicle. The yawing value indicates, for example, the oversteer state quantity (Jros) indicating a degree of the oversteer occurring at the vehicle, the difference of the longitudinal force (hFx) between the right and left wheels of the vehicle, and the like.

The stabilizing force calculating means (A4, A5, A6) calculates the stabilizing force (Tstb) (the stabilizing torque (Tstb)) for assisting (inducing) the counter-steering operation of the steering operation member (SW) operated by the driver for steering the steered wheels (WHfr, WHfl) of the vehicle on the basis of the yawing value (Ygc, hFx, Jros). The stabilizing force calculating means (A4, A5, A6) is configured so as to calculate the stabilizing force (Tstb) as follows: for example, the stabilizing force (Tstb) is calculated to zero (0) in the case where the yawing value (Ygc, hFx, Jros) is equal to or less than the predetermined value (Ygl, hFxl, Jrl), on the other hand, the stabilizing force (Tstb) is calculated so as to increase from zero (0) in response to the increase of the yawing value (Ygc, hFx, Jros) from the predetermined value (Ygl, hFxl, Jrl) in the case where the yawing value (Ygc, hFx, Jros) is greater than the predetermined value (Ygl, hfxl, Jrl).

The force applying means (A7) applies the stabilizing force (Tstb) to the steering operation member (SW) in the counter-steering direction (the direction of steering the steered wheels (WHfr, WHfl) in the counter-steering direction). Accordingly, the counter-steering operation by the driver is induced or assisted.

According to the steering control device of the above-described embodiments, the stabilizing force calculating means (A4, A5, A6) further includes the counter-steer value calculating means (A4, A5) for calculating the counter-steer value (Cstr, Cts, Cfs), which indicates a degree of steering the steered wheel (WHfr, WHfl) in the counter-steering direction, so that the stabilizing force (Tstb) is adjusted on the basis of the counter-steer value (Cstr, Cts, Cfs).

The counter-steer value is, for example, the counter-steer attained value (Cts) indicating the degree of achievement of steering the steered wheels (WHfr, WHfl) in the counter-steering direction. In this case, the greater the counter-steer attained value (Cts) is, the smaller value the stabilizing force (Tstb) is adjusted to be. The counter-steer attained value (Cts) is calculated on the basis of, for example, a value ($\delta$fa, $\theta$sw) corresponding to the actual steering angle of the steered wheels (WHfr, WHfl) in the case where the steered wheels (WHfr, WHfl) are steered in the counter-steering direction.

The counter-steer value is, for example, the counter-steer deficient value (Cfs), which indicates a degree of deficiency of steering the steered wheels (WHfr, WHfl) in the counter-steering direction. In this case, the smaller the counter-steer deficient value (Cfs) is, the smaller value the stabilizing force (Tstb) is adjusted to be. The counter-steer deficient value (Cfs) is calculated on the basis of, for example, the comparison result between a value (e.g. $\delta$ft) corresponding to the target steering angle, which is calculated on the basis of the yawing value (Ygc, hFx, Jros) and which stabilizes the vehicle, in the counter-steering direction of the steered wheels (WHfr, WHfl), and a value (e.g. $\delta$fa) corresponding to the actual steering angle of the steered wheels (WHfr, WHfl) (e.g. deviation h$\delta$f (=$\delta$ft−$\delta$fa)).

The "value corresponding to the target steering angle" indicates, for example, the target steering angle itself, a target operating amount of the steering operation member (SW) corresponding to the target steering angle and the like. Further, the "value corresponding to the actual steering angle" indicates, for example, the actual steering angle itself, an actual operating amount of the steering operation member (SW) corresponding to the actual steering angle and the like. The target steering angle ($\delta$ft) may be calculated as follows; firstly, the yawing moment (Mq) (the stabilizing yawing moment (Mq)) in the counter-steering direction to be applied for stabilizing the vehicle is calculated on the basis of the yawing value (Ygc, hFx, Jros); secondly, a steering angle of the steered wheels (WHfr, WHfl) necessary for generating the stabilizing yawing moment (Mq) is calculated on the basis of the stabilizing yawing moment (Mq) and the (inverse) model relating to the yaw motion of the vehicle; and thirdly, the calculated steering angle is determined as the target steering angle ($\delta$ft).

Accordingly, the greater the counter-steer attained value (Cts) is (or, the smaller the counter-steer deficient value (Cfs) is), the smaller the stabilizing force (Tstb) becomes. The counter-steer attained value (Cts) being great (or, the counter-steer deficient value (Cfs) being small) indicates that the driver performs the appropriate counter-steering operation.

Accordingly, in the case where the skilled driver performs the appropriate counter-steering operation while predicting the behavior of the vehicle (i.e. in the case where the degree of achievement of the counter-steering operation is great, or in the case where the degree of deficiency of the counter-steering operation is small), the stabilizing force (Tstb) applied to the steering operation member (SW) is determined to be smaller. In other words, the degree of reducing the steering force (Tsw) (the steering torque (Tsw)) by the stabilizing force (Tstb) becomes smaller by the stabilizing force (Tstb). Accordingly, the sense of discomfort the skilled driver feels, that the steering force during the counter-steering operation is reduced in contrary to his/her expectation, is prevented. Further, in the case where the counter-steer attained value (Cts) is small (or, in the case where the counter-steer deficient value (Cfs) is great), in other words, in the case where the driver does not perform the appropriate counter-steering operation, the stabilizing force (Tstb) is determined to be a greater value. As a result, the counter-steering operation is appropriately and sufficiently assisted (induced) for the driver, who is not skilled, by the greater stabilizing force (Tstb).

According to the above-described second embodiment, the force applying means (A7, A8) determines whether or not the counter-steering operation of the steering operating member (SW) is performed on the basis of the counter-steer value (Cstr, Cts, Cfs), in addition to the stabilizing force calculating means (A4, A5, A6) adjusting the stabilizing force (Tstb) on the basis of the counter-steer value (Cstr, Cts, Cfs). In the case where the force applying means (A7, A8) determines that the counter-steering operation is performed, the force applying means (A7, A8) does not apply the stabilizing force (Tstb). On the other hand, in the case where the force applying means (A7, A8) determines that the counter-steering operation is not performed, the force applying means (A7, A8) applies the stabilizing force (Tstb).

Accordingly, in the case where the skilled driver performs the appropriate counter-steering operation while predicting the behavior of the vehicle, the stabilizing force (Tstb) is not applied to the steering operation member (SW). Accordingly, the sense of discomfort the skilled driver feels, that the steering force (Tsw) is reduced in contrary to his/her expectation, is prevented. On the other hand, in the case where the driver does not perform the counter-steering operation, the appropriate degree of the stabilizing force (Tstb) is applied. As a result, the counter-steering operation is appropriately and sufficiently assisted (induced) for the driver, who is not skilled, by the appropriate degree of the stabilizing force (Tstb).

The case where the oversteer state quantity (Jros) is adapted as the yawing value, and where the steering control device further includes the braking force calculating means (A9) for calculating the target value (Fxt) of the braking force to be applied to the turning outer front wheel in order to stabilize the vehicle on the basis of the oversteer state quantity (Jros) and the braking force controlling means (A10) for applying the braking force to the turning outer front wheel on the basis of the target value (Fxt) of the braking force, in order to restrict the oversteer, will be described below.

In this case, the stabilizing force calculating means (A4, A5, A6) calculates the stabilizing force (Tstb) to zero (0) in the case where the oversteer state quantity (Jros) is equal to or less than the threshold value (Jrl). On the other hand, the stabilizing force calculating means (A4, A5, A6) calculates the stabilizing force (Tstb) so as to increase from zero (0) in response to the increase of the oversteer state quantity (Jros) from the threshold value (Jrl) in the case where the oversteer state quantity (Jros) is greater than the threshold value (Jrl). Further, the braking force calculating means (A9) calculates the target value (Fxt) of the braking force to zero (0) in the case where the oversteer state quantity (Jros) is equal to or less than the threshold value (Jrl). On the other hand, in the case where the oversteer state quantity (Jros) is greater than the threshold value (Jrl), the braking force calculating means (A9) calculates the target value (Fxt) of the braking force so as to increase from zero (0) in response to the increase of the oversteer state quantity (Jros) from the threshold value (Jrl).

In the vehicle in which the negative kingpin offset is adapted to the steered wheels (WHfr, WHfl) (the front wheels (WHfr, WHfl)), the force (Tsk), which is generated in the yawing motion direction of the vehicle (the direction of steering the steered wheels (WHfr, WHfl) in the turning direction) by the so-called torque steer (i.e. the torque steer induced force (Tsk)), acts on the steering operation member (SW) when applying the braking force to the turning outer front wheel in order to restrict the oversteer. On the other hand, as described above, the stabilizing force (Tstb) is applied to the steering operation member (SW) in the counter-steering direction (i.e. the direction of steering the steered wheels (WHfr, WHfl) in the counter-steering direction). Therefore, if either one of the "application of the braking force to the turning outer front wheel" or the "application of the stabilizing force (Tstb) to the steering operation member (SW)" is executed earlier than the other in the increasing process of the oversteer state quantity (Jros) while the vehicle is in the oversteer state, the driver may feel the "torque steer induced force (Tsk)", which is generated due to the "application of the braking force to the turning outer front wheel", which may result in generating the discomfort to the driver.

On the other hand, in the steering control device having the above-described configuration, the staring condition for the "application of the braking force to the turning outer front wheel" and the staring condition for the "application of the stabilizing force (Tstb) to the steering operation member (SW)" are set to be the same (i.e. the oversteer state quantity (Jros) exceeding the threshold (Jrl)). In other words, in the increasing process of the oversteer state quantity (Jros) while the vehicle is in the oversteer state, the "application of the braking force to the turning outer front wheel" and the "application of the stabilizing force (Tstb) to the steering operation member (SW)" are simultaneously started. As a result, the driver is less likely to feel the "torque steer induced force (Tsk)", which is generated due to the "application of the braking force to the turning outer front wheel". Accordingly, the stabilizing force (Tstb) is applied to the steering operation member (SW) without generating the discomfort for the driver.

As described above, in the case where the "application of the braking force to the turning outer front wheel" is executed, the stabilizing force calculating means (A4, A5, A6) calculates the stabilizing force (Tstb) so that the stabilizing force (Tstb) relative to the oversteer state quantity (Jros) becomes greater than the force (Tsk) (i.e. the torque steer induced force (Tsk)), which is generated due to the application of the braking force to the turning outer front wheel and which acts on the steering operation member (SW) in the direction of the yawing motion, within the range in which the oversteer state quantity (Jros) is greater than the threshold value (Jrl).

The torque steer induced force (Tsk) generated due to the "application of the braking force to the turning outer front wheel" increases in response to the increase of the oversteer state quantity (Jros), because the braking force to be applied increases in response to the increase of the oversteer state quantity (Jros). According to the configuration described in the third embodiment, in the state where the "application of the braking force to the turning outer front wheel" and the "application of the stabilizing force (Tstb) to the steering operation member (SW)" are both executed, the torque steer induced force (Tsk) is completely absorbed by the stabilizing force (Tstb). Accordingly, the driver is further less likely to feel the "torque steer induced force (Tsk)", which is generated due to the "application of the braking force to the turning outer front wheel".

Other embodiments of a steering control device for a vehicle will be described below in accordance with the attached drawings.

[Fourth Embodiment]

Illustrated in FIG. 1 is a schematic configuration of the vehicle, to which the steering control device according to a first embodiment is mounted.

In the fourth embodiment, when a steering wheel SW, which serves as a steering operation member, is operated, a rotational motion of the steering wheel SW is transmitted to a pinion gear PN as a rotational motion via a steering shaft SH. The rotational motion of the pinion gear PN is converted into a reciprocating motion (a movement in a right/left direction (a lateral direction) of a vehicle body) of a rack RK by means of the rack RK engaged with the pinion gear PN. A tie rod RK, which is integrally formed at the rack RK, moves in the right/left direction of the vehicle body in response to the movement of the rack RK, thereby steering steered wheels WHfl and WHfr, which are front wheels in this embodiment. Hence, an operating angle of the steering wheel SW from a neutral position is determined to correspond to a steering angle of the steered wheels WHfl and WHfr from a neutral position (i.e. a state where the vehicle travels straight).

An electric motor Me is connected to the tie rod TR via a reduction mechanism Ge. An operating force of the steering wheel SW (which is hereinafter referred to as a steering wheel operating force (i.e. steering torque)) applied by the driver is reduced by a driving force of the electric motor Me. In other words, a function of a so-called power steering control (EPS control) is achieved by the electric motor Me reducing the steering wheel operating force by the driving force of the electric motor Me.

A brake actuator BRK has a known configuration in which plural electromagnetic valves, a hydraulic pump, an electric motor and the like are included. The brake actuator BRK supplies a brake hydraulic pressure in response to an operation of a brake pedal BP by the driver to a wheel cylinder WC of each wheel when a brake control is not executed, so that a braking torque is applied to each wheel in response to the operation of the brake pedal BP. Further, the brake actuator BRK is configured to individually control the brake hydraulic pressure within the wheel cylinder WC independently of the operation of the brake pedal BP when the brake control, such as an anti-skid control (ABS control), a traction control (TCS control), a vehicle stability control (ESC control) for controlling an understeer/oversteer of the vehicle, or the like is executed, so that the braking torque is individually and separately adjusted for each wheel. Additionally, adjustment of the braking torque may be achieved by using an electric brake apparatus without using the brake hydraulic pressure.

Symbols '' are used to comprehensively indicate wheels, specifically, 'fl' indicates a front-left wheel, 'fr' indicate a front-right wheel, 'rl' indicates a rear-left wheel, and 'rr' indicates a rear-right wheel. Hence, for example, the wheel cylinder WC comprehensively indicates a front-left wheel cylinder WCfl, a front-right wheel cylinder WCfr, a rear-left wheel cylinder WCrl, and a rear-right wheel cylinder WCrr.

In the fourth embodiment, the steering control device includes a wheel speed sensor WS for detecting a wheel speed Vw, a steering wheel rotational angle sensor SA for detecting a rotational angle (from the neutral position) of the steering wheel SW (i.e. a steering wheel operating angle θsw), a steering torque sensor ST for detecting a steering torque Tsw of the steering wheel SW generated by the driver, a yaw rate sensor YR for detecting a yaw rate Yr of the vehicle body, a longitudinal acceleration sensor GX for detecting an acceleration generated in a front-rear direction (a longitudinal direction) of the vehicle body (i.e. a longitudinal acceleration Gx), a lateral acceleration sensor GY for detecting an acceleration generated in the lateral direction of the vehicle body (i.e. a lateral acceleration Gy), a steering angle sensor FS for detecting a steering angle δfa of the front wheels (the steered wheels) from the neutral position, a wheel cylinder pressure sensor PS for detecting a wheel cylinder pressure Pw, and an electronic control unit (ECU).

The ECU is a microcomputer that is configured with ECUb, ECUe and ECUs, which are connected to one another by means of a communication bus CB. The ECU is electrically connected to above-described each actuator such as the brake actuator BRK, and above-described each sensor and the like.

The ECUb is configured so as to execute the brake control such as the ABS control, the TCS control, the ESC control and the like on the basis of signals outputted from the wheel speed sensor WS**, the longitudinal acceleration sensor GX, the lateral acceleration sensor GY, and the like. The ECUe is configured so as to execute a control of an engine, which is not illustrated. The ECUs is configured so as to execute the EPS control on the basis of a signal outputted from the steering torque sensor ST and the like.

[Oversteer Restricting Control]

Figure 21:
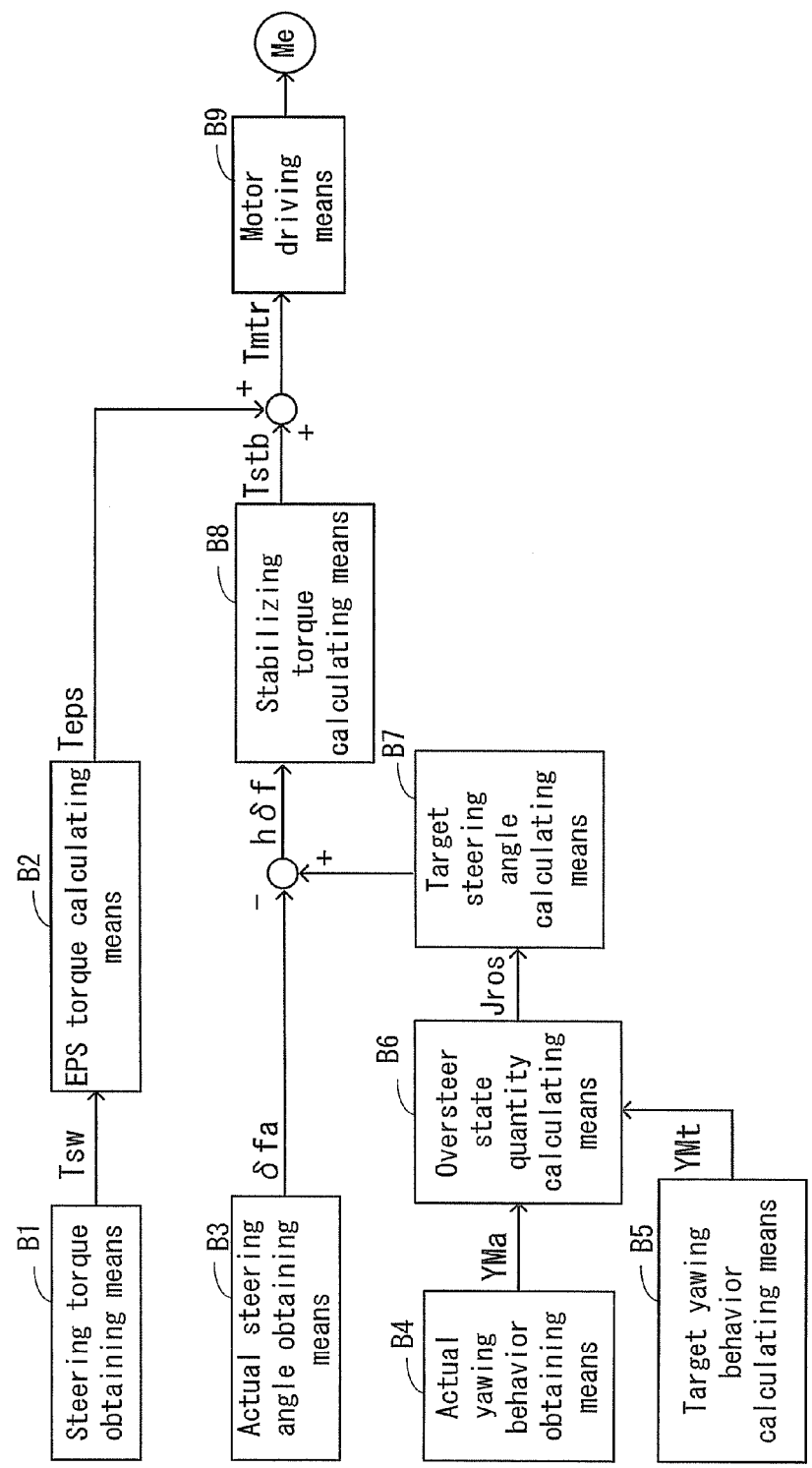
FIG. 21 is a functional block diagram of when the oversteer restricting control is executed by the steering control device illustrated in FIG. 1 relating to a fourth embodiment.

An oversteer restricting control executed by the steering control device according to the fourth embodiment will be described below with reference to FIG. 21. In the fourth embodiment, only a steering torque control is executed as the oversteer restricting control. Accordingly, the steering torque control will be described hereinbelow.

At a steering torque obtaining means B1, the steering torque Tsw of the steering wheel SW (i.e. the operating force of the steering operation member), generated by the driver, is obtained by the steering torque sensor ST. A target value Teps of a power steering torque (EPS torque) (which will be hereinafter referred to as a EPS torque target value Teps) for reducing the steering torque of the driver is calculated at an EPS torque calculating means B2 on the basis of the obtained steering torque Tsw. The EPS torque target value Teps is calculated in a manner where the greater the steering torque Tsw is, the greater value the EPS torque target value Teps is calculated to be. The EPS torque target value Teps is a value directing to reduce the steering torque Tsw of the driver.

The actual steering angle δfa of the front-wheels (the steered wheels) is obtained at an actual steering angle obtaining means B3. The actual steering angle δfa is calculated on the basis of a detection value of the steering angle sensor FS. Further, the actual steering angle δfa may be calculated by using a relationship: δfa=θsw/SG, on the basis of the steering wheel operating angle θsw, which is detected by the steering wheel rotational angle sensor SA. "SG" in the equation (δfa=θsw/SG) indicates a steering gear ratio.

An actual yawing behavior YMa (e.g. the yaw rate Yr) is obtained at an actual yawing behavior obtaining means B4. The yawing behavior indicates a motion of the vehicle in a yaw direction, and a motion in which a traveling direction of the vehicle changes (i.e. a motion in which the vehicle deflects). Accordingly, the yaw rate Yr or a value calculated on the basis of the yaw rate Yr is used as the yawing behavior YMa.

A target yawing behavior YMt is calculated at a target yawing behavior calculating means B5. The target yawing behavior YMt is calculated on the basis of, for example, the steering wheel operating angle θsw, a vehicle speed Vx obtained from the wheel speed Vw**, and the like.

An oversteer state quantity Jros, which indicates a degree of the oversteer, is calculated at an oversteer state quantity calculating means B6 on the basis of a comparison result between the actual yawing behavior YMa and the target yawing behavior YMt (e.g. a deviation between the actual yawing behavior YMa and the target yawing behavior YMt).

Alternatively, the oversteer state quantity Jros may be calculated on the basis of the actual yawing behavior YMa without using the target yawing behavior YMt. In this case, for example, the oversteer state quantity Jros is calculated on the basis of a table illustrated in FIG. 5, a sideslip angle β (a slip angle β) of the vehicle, and a sideslip angular speed dβ of the vehicle. According to the table illustrated in FIG. 5, the oversteer state quantity Jros is determined to be a greater value in response to an increase of the sideslip angle β and the sideslip angular speed dβ (i.e. the oversteer state quantity Jros is determined to be a greater value in the upper right range of the table illustrated in FIG. 5), with reference to a curved line indicating that the oversteer state quantity Jros is zero (0) as a base line.

The sideslip angle β of the vehicle (the actual yawing behavior YMa) is calculated by using the know method on the basis of the yaw rate Yr, the lateral acceleration Gy, the vehicle speed Vx and the like. Similarly, the sideslip angle speed dβ of the vehicle (the actual yawing behavior YMa) is calculated by using the known method on the basis of the yaw rate Yr, the lateral acceleration Gy, the vehicle speed Vx and the like.

Additionally, the sideslip angle β may be replaced with a sideslip angular deviation hβ in a horizontal axis in the table illustrated in FIG. 5. The sideslip angular deviation hβ is a deviation between a target value βt of the sideslip angle (which will be hereinafter referred to as a sideslip angle target value βt) (the target yawing behavior YMt) and an actual value βa of the sideslip angle (the actual yawing behavior YMa). Similarly, the sideslip angular speed dβ may be replaced with a yaw rate deviation hYr in a vertical axis in the table illustrated in FIG. 5. The yaw rate deviation hYr is a deviation between a target value Yrt of the yaw rate (which will be hereinafter referred to as a yaw rate target value Yrt) (the target yawing behavior YMt) and an actual value Yra of the yaw rate (the actual yawing behavior YMa). Each of the sideslip angle target value βt and the yaw rate target value Yrt is calculated by using the know method on the basis of a driving operation by the driver (i.e. the steering wheel operating angle θsw, the vehicle speed Vx and the like).

Figure 22:
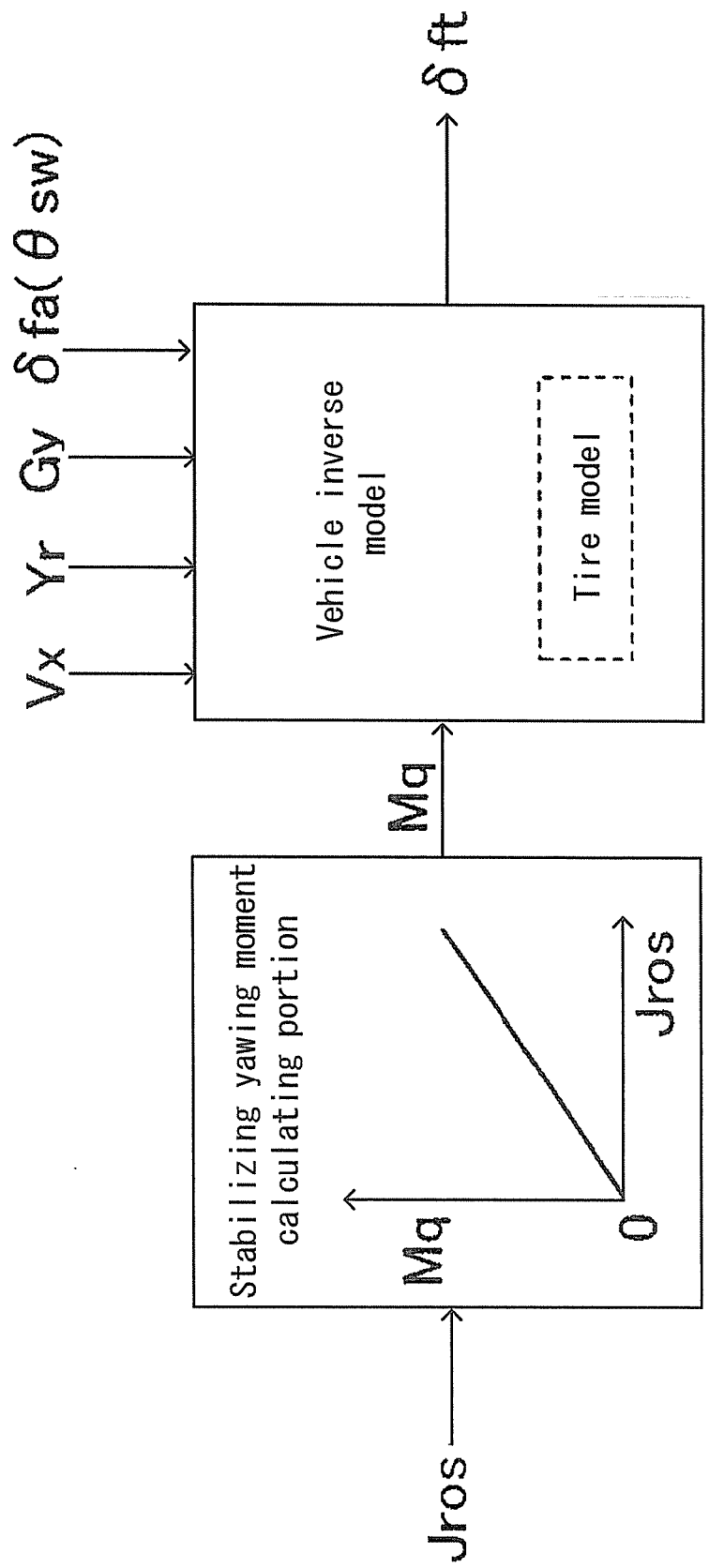
FIG. 22 is a functional block diagram of when a target steering angle is calculated from the oversteer state quantity by the steering control device illustrated in FIG. 1.

A target steering angle δft of the front wheels is calculated at a target steering angle calculating means B7 on the basis of the oversteer state quantity Jros. More specifically, the target steering angle δft is calculated as follows. Firstly, as illustrated in FIG. 22, a stabilizing yawing moment Mq necessary for stabilizing the vehicle is calculated on the basis of the oversteer state quantity Jros at a stabilizing yawing moment calculating portion. Accordingly, the greater the oversteer state quantity Jros is, the greater value the stabilizing yawing moment Mq is calculated to be.

Secondly, the target steering angle δft is calculated by inputting the stabilizing yawing moment Mq into an inverse model of the vehicle (i.e. a vehicle inverse model). The inverse model of the vehicle is a model opposite to a vehicle model for calculating the vehicle behavior such as the yaw rate by inputting thereinto the vehicle speed, the steering angle and the like. Further, the inverse model of the vehicle is a model for calculating the target steering angle δft of the front-wheels by inputting thereinto the vehicle behavior such as the yaw rate (i.e. a known simultaneous equation of motion). More specifically, for example, the target steering angle δft of the front wheels necessary for obtaining the stabilizing yawing moment Mq relative to the current vehicle speed Vx, the lateral acceleration Gy, the yaw rate Yr, the actual steering angle δfa (or, the steering wheel operating angle θsw) is calculated by using the inverse model of the vehicle including a tire model indicating a tire characteristic.

Figure 23:
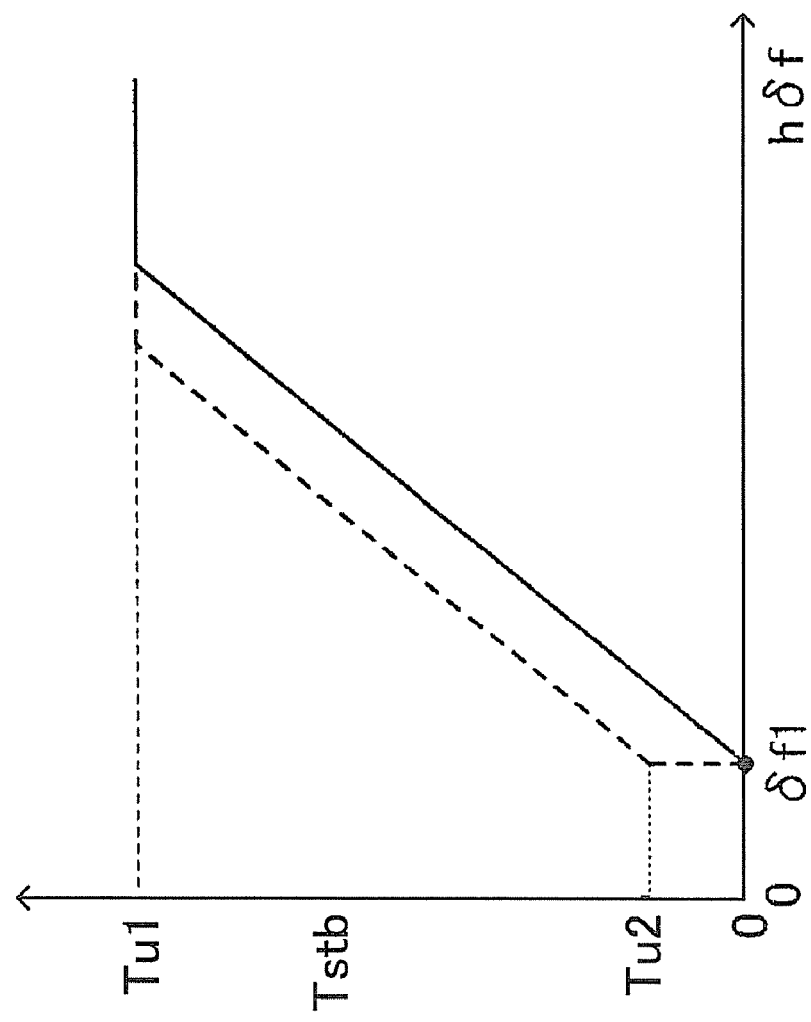
FIG. 23 is a graph illustrating a characteristic of the stabilizing torque relative to a steering angle deviation.

A stabilizing torque Tstb, which serves as the stabilizing force and which is a steering torque for assisting (inducing) the counter-steering operation for stabilizing the vehicle, is calculates at a stabilizing torque calculating means B8 (a stabilizing force calculating means) so as to follow a characteristic illustrated by a solid line in FIG. 23 on the basis of the steering angle deviation hδf. The steering angle deviation hδf is a deviation between the target steering angle δft and the actual steering angle δfa (i.e. steering angle deviation hδf=δft−δfa). The stabilizing torque Tstb is a value in the counter-steering direction (i.e. a direction of steering the steered wheels in the counter-steering direction).

Accordingly, the stabilizing torque Tstb is calculated to zero (0) in a case where the steering angle deviation hδf is less than a threshold value δfl. On the other hand, in a case where the steering angle deviation hδf is equal to or greater than the threshold value δfl, the stabilizing torque Tstb is calculated to so as to increase from zero (0) in response to an increase of the steering angle deviation hδf from the threshold value δfl. However, the stabilizing torque Tstb is limited to be equal to or lower than a predetermined limit value Tu1 by the characteristic illustrated in FIG. 23. Alternatively, the stabilizing torque Tstb may be limited to be equal to or less than the limit value Tu1 by limiting the steering angle deviation hδf.

At a motor driving means B9 (a force applying means), the electric motor Me is driven on the basis of a target value Tmtr for drive-controlling the electric motor Me, whish is obtained by adding the stabilizing torque Tstb to the EPS torque target value Teps (target value Tmtr=EPS torque target value Teps+ stabilizing torque Tstb).

Accordingly, a driving force corresponding to the target value Tmtr is applied to the tie rod TR, thereby applying a torque of directing to reduce the steering torque Tsw of the driver (the EPS torque Teps) and a torque in the counter-steering direction (the stabilizing torque Tstb) relative to the steering wheel SW. As a result, the counter-steering operation by the driver is assisted (induced) by the stabilizing torque Tstb.

As described above, the steering torque control is executed on the basis of the steering torque Tsw and the steering angle deviation hδf, so that the stabilizing torque Tstb is applied to the steering wheel SW in the counter-steering direction (a steering direction opposite to the turning direction of the vehicle) while the vehicle is in the oversteer state. As described above, the smaller the steering angle deviation hδf is, the smaller value the stabilizing torque Tstb is calculated to be (see FIG. 23). The steering angle deviation hδf being small indicates that the driver performs an appropriate counter-steering operation.

Accordingly, in a case where the skilled driver performs the appropriate counter-steering operation while predicting the behavior of the vehicle, the stabilizing torque Tstb is set to be smaller. Therefore, the sense of discomfort the skilled driver feels, that a steering force during the counter-steering operation is reduced in contrary to his/her expectation, is prevented.

On the other hand, in the case where the steering angle deviation hδf is great, i.e. in a case where the driver does not perform the appropriate counter-steering operation, the stabilizing torque Tstb is set to be greater. As a result, the counter-steering operation is appropriately and sufficiently induced or assisted for the driver, who is not skilled, by the greater stabilizing torque Tstb.

An operation (actuation) of the steering control device of the fourth embodiment will be described bellow with reference to FIG. 11. Illustrated in FIG. 11 is a general tire characteristic (a relationship between a sideslip angle a and a lateral force Fy of the steered wheels). The sideslip angle a of the steered wheels has a certain relationship relative to the actual steering angle δfa (or, the target steering angle δft). Further, the lateral force Fy of the steered wheels has a certain relationship relative to the stabilizing yawing moment Mq. Accordingly, the operation of the steering control device of the first embodiment is explained as follows by using the characteristic illustrated in FIG. 11 by considering that a horizontal axis also represents the actual steering angle δfa (the target steering angle δft) and a vertical axis also represents the stabilizing yawing moment Mq in the tire characteristic illustrated in FIG. 11. Additionally, in this embodiment, a first quadrant (an upper right region) corresponds to a state where the vehicle turns left, and a third quadrant (a lower left region) corresponds to a state where the vehicle turns right in the characteristic illustrated in FIG. 11.

In a case where an excessive oversteer occurs at the vehicle, the counter-steering operation needs to be performed so as to generate the stabilizing yawing moment Mq for stabilizing the vehicle in order to ensure the stability of the vehicle. For example, as illustrated in FIG. 12, in a case where the oversteer occurs at the vehicle while turning right (while the vehicle is turning in a clockwise direction when viewed from above the vehicle), the counter-steering operation needs to be performed in a left-turn direction (i.e. in a counterclockwise direction of the steering wheel when viewed from the driver) in order to generate the stabilizing moment Mq (see FIG. 12) by reducing the yawing moment generated in a right-turn direction (in the clockwise direction when viewed from above the vehicle) and by increasing the yawing moment in the left-turn direction (i.e. in the counterclockwise direction when viewed from above the vehicle). In this case, it is assumed that the front wheel steering angle needs to reach the target steering angle δft, which corresponds to a point B, by performing the counter-steering operation in order to generate the stabilizing moment Mq in the left-turn direction. However, in a case where the front wheel steering angle is found to correspond to the actual steering angle δfa, which corresponds to a point A, because the driver does not perform the counter-steering operation or because the counter-steering operation by the driver is not sufficient, the stabilizing torque Tstb is applied to the steering wheel SW in the left-turn direction (i.e. in the counterclockwise direction of the steering wheel when viewed from the driver, in the direction of steering the steered wheels to the left) in response to the steering angle deviation hδf (=δft−δfa) (see e.g. FIG. 23).

According to the steering control device of the fourth embodiment, the steering torque control (the application of the stabilizing torque Tstb) is executed as the oversteer restricting control. In the steering torque control, the EPS torque Teps for reducing the steering torque is calculated on the basis of the steering torque Tsw generated by the driver. Further, the target steering angle δft in the counter-steering direction is calculated on the basis of the oversteer state quantity Jros, which indicates the degree of the oversteer. The stabilizing torque Tstb for inducing or assisting the counter-steering operation is calculated on the basis of the deviation between the target steering angle δft and the actual steering angle δfa (the steering angle deviation hδf=δft−δfa). Then, the torque Teps in the direction of reducing the steering torque Tsw generated by the driver and the torque Tstb in the counter-steering direction are applied to the steering wheel SW. Accordingly, the counter-steering operation by the driver is assisted (induced) by the stabilizing torque Tstb.

In the case where the steering angle deviation hδf is great, i.e. in the case where the driver does not perform the appropriate counter-steering operation, the stabilizing torque Tstb is set to be a greater value. As a result, the counter-steering operation is appropriately and sufficiently induced or assisted by the greater stabilizing torque Tstb for the driver who is not skilled. On the other hand, in the case where the steering angle deviation hδf is small, i.e. in the case where the driver performs the appropriate counter-steering operation with predicting the behavior of the vehicle, the stabilizing torque Tstb is set to be a smaller value. As a result, the sense of discomfort the skilled driver feels, that the steering force during the counter-steering operation is reduced in contrary to his/her expectation, is restricted.

[Fifth Embodiment]

A steering control device according to a fifth embodiment will be described below. The steering control device of the fifth embodiment differs from the steering control device of the fourth embodiment in that the steering control device of the fifth embodiment executes a braking force control (an application of a barking force to an turning outer front wheel) as the oversteer restricting control in addition to the steering torque control (the application of the stabilizing torque Tstb) of the fourth embodiment. Hereinbelow, only the differences will be described.

Figure 24:
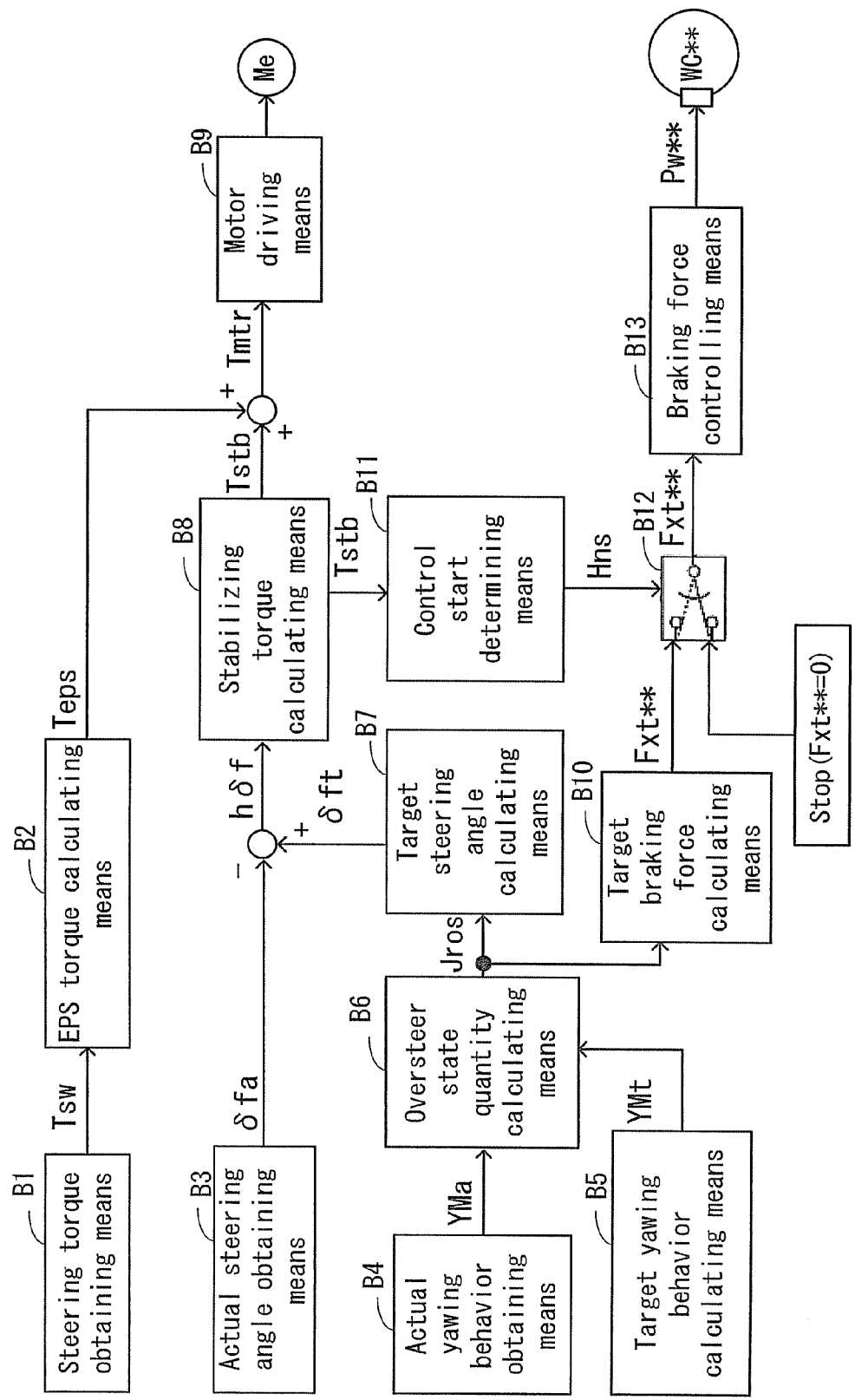
FIG. 24 is a functional block diagram of when the oversteer restricting control is executed by a steering control device according to a fifth embodiment.

Illustrated in FIG. 24 is a functional block diagram of when the oversteer restricting control is executed by the steering control device relating to the fifth embodiment. As illustrated in FIG. 24, the steering control device of the fifth embodiment further includes a target braking force calculating means B10 (a braking force calculating means), a control start determining means B11, a switching means B12 and a barking force controlling means B13, comparing to the steering control device of the fourth embodiment (see FIG. 21). Accordingly, the braking force control (the ESC control) for restricting the oversteer of the vehicle is executed on the basis of the oversteer state quantity Jros.

More specifically, at the target braking force calculating means B10, a target value of the braking force of each wheel (i.e. a target braking force Fxt) is calculated by following a characteristic illustrated in FIG. 19 on the basis of the oversteer state quantity Jros. Accordingly, the target braking force Fxt is calculated to zero (0) (Fxt=0 (Stop)) in a case where the oversteer state quantity Jros is less than a threshold value Jrl. On the other hand, in a case where the oversteer state quantity Jros is equal to or greater than the threshold value Jrl, the target braking force Fxt is calculated so as to increase from zero (0) in response to an increase of the oversteer state quantity Jros from the threshold value Jrl (however, the target braking force Fxt** is limited to be equal to or less then a value Fxl).

A start determination of the braking force control is executed at the control start determining means B11 on the basis of the stabilizing torque Tstb. More specifically, in a case where the stabilizing torque Tstb is zero (0), the control start determining means B11 concludes a determination of denying a start of the braking force control (i.e. a negative determination). On the other hand, in a case where the stabilizing torque Tstb is calculated to be a greater value than zero (0), the control start determining means B11 concludes a determination of affirming the start of the braking force control (i.e. a positive determination).

At the switching means B12, the target braking force Fxt is not outputted to the braking force controlling means B13 on the basis of a determination result Hns of the control start determining means B11 in the case where the determination of denying the start of the braking force control is concluded. On the other hand, in the case where the determination of affirming the start of the braking force control is concluded, the target braking force Fxt is outputted to the braking force controlling means B13.

At the braking force controlling means B13, the brake actuator BRK is driven on the basis of the target braking force Fxt in the case where the target braking force Fxt is outputted to the braking force controlling means B13. Accordingly, the braking force of each wheel is adjusted so as to correspond to the target braking force Fxt**. As a result, the braking force of the turning outer front wheel is increased independently of the operation of the brake pedal BP by the driver.

As a result, in the case where the stabilizing torque Tstb is zero (0), the braking force control (i.e. the application of the braking force to the turning outer front wheel) it not executed. On the other hand, the braking force control is executed on the basis of the oversteer state quantity Jros under a condition where a relationship "the stabilizing torque Tstb being greater than zero (0) (stabilizing torque Tstb>0)", which is set as a starting condition. In other words, the "application of the braking force to the turning outer front wheel" and the "application of the stabilizing torque Tstb" are simultaneously started. Accordingly, in the fifth embodiment, the oversteer of the vehicle is restricted also by the braking force control in addition to the above-described steering torque control executed by the steering control device of the fourth embodiment.

A case where a negative kingpin offset is adapted to the steered wheels (the front wheels) of the vehicle as illustrated in FIG. 20 will be considered below. The negative kingpin offset indicates a case where an intersection point Pkp of a center axis of a kingpin (i.e. an intersection point Pkp at which the center axis of the kingpin intersects with the road surface)

is positioned at an outer side in a vehicle width direction relative to a load application point Pbf of the longitudinal force (the longitudinal force Fxfr generated at the front right wheel WHfr) (i.e. a point Pbf at which the longitudinal force is applied).

When the braking force is applied to the steered wheels of the vehicle to which the negative kingpin offset is adapted to the steered wheels, a torque of steering the steered wheels in response to the braking force is generated due to an existence of a distance Ofs (the kingpin offset) between the application point Pbf of the braking force and the intersection point Pkp of the center axis of the kingpin. This phenomenon is also called as a "torque steer".

For example, as illustrated in FIG. 20, in the case where the braking force Fxfr is applied to the turning outer front wheel WHfr by the above-described braking force control (the ESC control) when the oversteer occurs at the vehicle while turning left, a torque Tkp (a force), which is calculated by multiplying the distance Ofs by the braking force Fxfr (i.e. Tkp=Ofs·Fxfr) and which steers the front wheels in the left-turn direction, acts on the front wheels because of the torque steer. The torque Tkp acts on the steering wheel SW as a torque Tsk for rotating the steering wheel SW in the left-turn direction (i.e. in the counterclockwise direction when viewed from the driver).

On the other hand, in this case, the stabilizing torque Tstb is applied to the steering wheel SW in the right-turn direction (i.e. in the clockwise direction when viewed from the driver), because the counter-steering direction is the right-turn direction.

Accordingly, if either one of the "application of the braking force to the turning outer front wheel" or the "application of the stabilizing torque Tstb" is started earlier than the other (i.e. if the "application of the braking force to the turning outer front wheel" and the "application of the stabilizing torque Tstb" are not simultaneously started) in an increasing process of the oversteer state quantity Jros while the vehicle is in the oversteer state, the driver may feel the "torque steer", which is generated due to the "application of the braking force to the turning outer front wheel", which may result in causing discomfort for the driver.

On the other hand, in the fifth embodiment, the starting condition of the "application of the braking force to the turning outer front wheel" and the starting condition of the "application of the stabilizing torque Tstb" are set to be the same (i.e. oversteer state quantity Jros>0). Accordingly, in the increasing process of the oversteer state quantity Jros while the vehicle is in the oversteer state, the "application of the braking force to the turning outer front wheel" and the "application of the stabilizing torque Tstb" are simultaneously started. As a result, the driver is less likely to feel "the torque steer", which is generated due to the "application of the braking force to the turning outer front wheel", therefore, the application of the stabilizing torque Tstb is executed without causing discomfort to the driver.

The present invention is not limited to the above-described embodiments, but the various modification and changes may be applied to the steering control device without departing from the spirit of the present invention. For example, in the above-described embodiments, the steering wheel SW and the steered wheels WHfl and WHfr are mechanically connected. However, a so-called steer-by-wire system, in which the steering wheel SW and the steered wheels WHfl and WHfr are not mechanically connected, may be adapted. The steer-by-wire system is a mechanism for controlling the front wheel steering angle on the basis of an electric signal indicating the operating angle θsw of the steering wheel SW. In this case, a rod-like portion (a so-called joystick) may be used as the steering operation member instead of the steering wheel SW.

Further, in the fifth embodiment, the torque Tsk, which acts on the steering wheel SW because of "the torque steer", is generated in response to the braking force applied to the turning outer front wheel (i.e. the oversteer state quantity Jros) (see FIG. 19). On the other hand, the stabilizing torque Tstb is generated on the basis of the steering angle deviation hδf (not on the basis of the oversteer state quantity Jros) (see FIG. 23). Accordingly, in the case where the steering angle deviation hδf is small and the oversteer state quantity is great while the "application of the braking force to the turning outer front wheel" and the "application of the stabilizing torque Tstb" are both executed (i.e. hδf>δfl and Jros>Jrl), a case where the torque Tsk becomes greater than the stabilizing torque Tstb (Tsk >Tstb) may occur.

Accordingly, the steering control device may be modified so as to limit the braking force applied to the turning outer front wheel, which is calculated following the characteristic illustrated in FIG. 19, while the torque Tsk and the stabilizing torque Tstb are generated, so that the torque Tsk becomes always smaller than the stabilizing torque Tstb (Tsk<Tstb). Additionally, the torque Tsk relative to the braking force applied to the turning outer front wheel (i.e. the oversteer state quantity Jros) may be preliminarily obtained through an experiment and the like. According to the above-described configuration of the steering control device, the torque Tsk generated due to the "torque steer" is completely absorbed by the stabilizing torque Tstb. As a result, the driver is further less likely to feel the above-described "torque steer".

Further, because the torque Tsk relative to the braking force applied to the turning outer front wheel (i.e. the oversteer state quantity Jros) is preliminarily obtained through the experiment and the like, the torque Tsk is considered in a setting of the stabilizing torque Tstb. More specifically, as indicated by a characteristic illustrated by a dashed line in FIG. 23, a characteristic, in which the stabilizing torque Tstb increases from zero (0) to a value Tu2 in a stepwise manner when the steering angle deviation hδf becomes the value δfl, is adapted for the determination of the stabilizing torque Tstb. The value Tu2 is a predetermined value, which is preliminarily set. Further, the value Tu2 is calculated on the basis of at least one of the braking force applied to the turning outer front wheel (e.g. the target value Fxt**) and the oversteer state quantity Jros. Accordingly, the "application of the stabilizing torque Tstb" and the "application of the braking force to the turning outer front wheel" are simultaneously started when the steering angle deviation hδf becomes greater than the value δfl, and the stabilizing torque Tstb is increased from zero (0) up to the value Tu2 in the stepwise manner at the time when the "application of the stabilizing torque Tstb" and the "application of the braking force to the turning outer front wheel" are simultaneously started. As a result, the torque Tsk is compensated and the stabilizing torque Tstb is surely applied in the counter-steering direction.

Additionally, in the above-described embodiments, the steering control device is configured so as to drive the electric motor Me on the basis of the target value Tmtr (=Teps+Tstb) for drive-controlling the electric motor Me. However, the steering control device may be modified so as to drive the electric motor Me on the basis of the target value Tmtr (=Tstb) for drive-controlling the electric motor Me. In this case, only the stabilizing torque Tstb is applied to the steering wheel SW in the counter-steering direction. Accordingly, the counter-steering operation by the driver is assisted (induced) by the stabilizing torque Tstb.

In the above-described embodiments, the actual yawing behavior obtaining means B4, the target yawing behavior calculating means B5 and the oversteer state quantity calculating means B6 serve as a state quantity calculating means. Further, in the fifth embodiment, the control start determining means B11, the switching means B12 and the braking force controlling means B13 serve as a braking force controlling means.

The steering control device according to the embodiments includes the state quantity calculating means (B4, B5, B6), the target steering angle calculating means (B7), the actual steering angle obtaining means (B3), the stabilizing force calculating means (B8) and the force applying means (B9). Those means will be explained hereinbelow in this order.

The state quantity calculating means (B4, B5, B6) obtains the value (YMa) corresponding to the yawing motion of the vehicle and calculates the oversteer state quantity (Jros), which indicates the degree of the oversteer of the vehicle, on the basis of the value (YMa) corresponding to the yawing motion. The value corresponding to the yawing motion is, for example, the yaw rate (Yr), the sideslip angle ($\beta$) of the vehicle body, the sideslip angular speed ($d\beta$) of the vehicle body and the like.

The target steering angle calculating means (B7) calculates the value ($\delta$ft), which stabilizes the vehicle and which corresponds to the target steering angle of the steered wheels (WHfr, WHfl) in the counter-steering direction (relative to the neutral position), on the basis of the oversteer state quantity (Jros). The value ($\delta$ft) corresponding to the target steering angle indicates, for example, the target steering angle itself, a target operating amount of the steering operation member (SW) corresponding to the target steering angle, and the like. The target steering angle calculating means (B7) may be modified so as to obtain the target steering angle, for example, as follows: firstly, the target steering angle calculating means (B7) calculates the yawing moment (Mq) (the stabilizing yawing moment (Mq)) in the direction opposite to the turning direction of the vehicle to be applied for stabilizing the vehicle on the basis of the oversteer state quantity (Jros); secondly, the target steering angle calculating means (B7) calculates the steering angle of the steered wheels (WHfr, WHfl) necessary for generating the stabilizing yawing moment (Mq) on the basis of the stabilizing yawing moment (Mq) and the (inverse) model relating to the yawing motion of the vehicle; and then, the target steering angle calculating means (B7) determines the calculated steering angle as the target steering angle.

The actual steering angle obtaining means (B3) obtains the value ($\delta$fa, $\theta$sw), which corresponds to the actual steering angle of the steered wheels (WHfr, WHfl). The value corresponding to the actual steering angle indicates, for example, the actual steering angle itself, an actual operating amount of the steering operation member (SW) corresponding to the actual steering angle, and the like.

The stabilizing force calculating means (B8) calculates the stabilizing force (Tstb) (the stabilizing torque (Tstb)) for inducing or assisting the counter-steering operation of the steering operation member (SW), which is operated by the driver in order to steer the steered wheels (WHfr, WHfl), on the basis of the comparison result between the target steering angle corresponding value ($\delta$ft) and the actual steering angle corresponding value ($\delta$fa, $\theta$sw). The stabilizing force calculating means (B8) calculates the stabilizing force (Tstb), for example, as follows: the stabilizing force calculating means (B8) calculates stabilizing force (Tstb) to zero (0) in the case where the difference between the target steering angle corresponding value ($\delta$ft) and the actual steering angle corresponding value ($\delta$fa, $\theta$sw) (i.e. the steering angle deviation (h$\delta$f (=$\delta$ft−$\delta$fa)) is less than the threshold value ($\delta$fl), on the other hand, in the case where the steering angle deviation (h$\delta$f) is equal to or greater than the threshold value ($\delta$fl), the stabilizing force calculating means (B8) calculates the stabilizing force (Tstb) so as to increase (from zero (0)) in response to the increase of the difference from the threshold value ($\delta$fl).

The force applying means (B9) applies the stabilizing force (Tstb) to the steering operation member (SW) in the counter-steering direction (the direction of steering the steered wheels (WHfr, WHfl) in the counter-steering direction).

Accordingly, for example, the smaller the steering angle deviation (h$\delta$f) is, the smaller the stabilizing force (Tstb) (the stabilizing torque (Tstb)), which is applied to the steering operation member (SW) in the counter-steering direction, becomes. The steering angle deviation (h$\delta$f) being small indicates that the driver performs the appropriate counter-steering operation.

Accordingly, in the case where the skilled driver performs the appropriate counter-steering operation while predicting the behavior of the vehicle (i.e. in the case where a degree of achievement of the counter-steering operation is great), the stabilizing force (Tstb) to be applied to the steering operation member (SW) is determined to be smaller. In other words, a degree of reducing the steering force (Tsw) (the steering torque (Tsw)) by the stabilizing force (Tstb) becomes smaller. Accordingly, the sense of discomfort the skilled driver feels, that the steering force during the counter-steering operation is reduced in contrary to his/her expectation, is restricted. Further, in the case where the steering angle deviation (h$\delta$f) is great, in other words, in the case where the driver does not perform the appropriate counter-steering operation, the stabilizing force (Tstb) is determined to be a greater value. As a result, the counter-steering operation is appropriately and sufficiently assisted (induced) for the driver, who is not skilled, by the greater stabilizing force (Tstb).

Described below is the case where the steering control device according to the above-described embodiments further includes the braking force calculating means (B10) for calculating the target value (Fxt) of the braking force to be applied to the turning outer front wheel of the vehicle in order to stabilize the vehicle on the basis of the oversteer state quantity (Jros), and the braking force controlling means (B11, B12, B13) for applying the braking force to the turning outer front wheel on the basis of the target value (Fxt) of the braking force.

In this case, the braking force controlling means (B11, B12, B13) does not apply the braking force to the turning outer front wheel in the case where the stabilizing force (Tstb) is zero (0). On the other hand, in the case where the stabilizing force (Tstb) is greater than zero (0), the braking force controlling means (B11, B12, B13) applies the braking force to the turning outer front wheel.

In the vehicle in which the negative kingpin offset is adapted to the steered wheels (WHfr, WHfl) (the front wheels (WHfr, WHfl)), the force (Tsk), which is generated in the turning direction (the direction of steering the steered wheels (WHfr, WHfl) in the turning direction) by the so-called "torque steer", acts on the steering operation member (SW) when applying the braking force to the turning outer front wheel in order to restrict the oversteer. On the other hand, as described above, the stabilizing force (Tstb) is applied to the steering operation member (SW) in the counter-steering direction (i.e. the direction of steering the steered wheels (WHfr, WHfl) in the counter-steering direction). Therefore, if either one of the "application of the braking force to the turning outer front wheel" or the "application of the stabilizing force (Tstb) to the steering operation member (SW)" is executed earlier than the other in the increasing process of the oversteer state quantity (Jros) while the vehicle is in the oversteer state, the driver may feel the "torque steer", which is generated due to the "application of the braking force to the turning outer front wheel", which may result in causing discomfort to the driver.

On the other hand, in the above-described configuration of the steering control device, the "application of the braking force to the turning outer front wheel" is started at the time when the stabilizing force (Tstb) increases from zero (0). In other words, in the increasing process of the oversteer state quantity (Jros) while the vehicle is in the oversteer state, the "application of the braking force to the turning outer front wheel" and the "application of the stabilizing force (Tstb) to the turning outer front wheel" are simultaneously started. As a result, the driver is less likely to feel the "torque steer" induced due to the "application of the braking force to the turning outer front wheel", therefore, the stabilizing force (Tstb) is applied to the steering operation member (SW) without causing the discomfort to the driver.

In this case, the stabilizing force calculating means (B8) may be configured so as to calculate the stabilizing force (Tstb) to be stepwisely increased from zero (0) to the predetermined value (Tu2) when the steering angle deviation (hδf) becomes (reaches) the threshold value (δfl). The predetermined value (Tu2) is calculates on the basis of at least one of the target value (Fxt**) of the braking force and the oversteer state quantity (Jros).

Accordingly, when the steering angle deviation (hδf) reaches the threshold value (δfl) in the increasing process of the oversteer state quantity (Jros) while the vehicle is in the oversteer state, the stabilizing force (Tstb) is stepwisely increased from zero (0) up to the predetermined value (Tu2) (>zero (0)), in addition to the simultaneous start of the "application of the braking force to the turning outer front wheel" and the "application of the stabilizing force (Tstb) to the steering operation member (SW)". As a result, the "torque steer" is compensated, and the stabilizing force (Tstb) is surely applied in the counter-steering direction.

According to the steering control device of the above-described embodiments, the stabilizing force calculating means (B8) is configured so as to calculate the stabilizing force (Tstb) to be limited to be equal to or less than the predetermined limit value (Tu1).

Accordingly, the steering control device prevents an occurrence of a situation where the vehicle sways because the stabilizing force (Tstb) becomes excessively great value and because the driver excessively operates the steering operation member (SW) in the counter-steering direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering control device for a vehicle comprising:
a yawing value obtaining unit which obtains a yawing value, which is a value corresponding to a yawing motion of the vehicle;
a stabilizing force calculating unit which calculates a stabilizing force for assisting an operation of a steering operation member, which is operated by a driver of the vehicle in order to steer a steered wheel of the vehicle, in a direction opposite to a direction of the yawing motion of the vehicle, on the basis of the yawing value; and
a force applying unit which applies the stabilizing force to the steering operation member in the direction opposite to the direction of the yawing motion of the vehicle, wherein
the stabilizing force calculating unit includes a counter-steer value calculating unit which calculates a counter-steer value, which indicates a degree of steering the steered wheel in the direction opposite to the direction of the yawing motion of the vehicle, and wherein
the stabilizing force is adjusted on the basis of the counter-steer value.

2. The steering control device for the vehicle according to claim 1, wherein the counter-steer value calculating unit calculates a counter-steer attained value, which indicates a degree of achievement of steering the steered wheel in the direction opposite to the direction of the yawing motion of the vehicle, as the counter-steer value, and wherein the stabilizing force calculating unit adjusts the stabilizing force in a manner where the greater the counter-steer attained value is, the smaller value the stabilizing force is adjusted to be.

3. The steering control device for the vehicle according to claim 2, wherein the counter-steer value calculating unit includes an actual steering angle obtaining unit which obtains an actual steering angle corresponding value, which corresponds to an actual steering angle of the steered wheel, so that the counter-steer attained value is calculated on the basis of the actual steering angle corresponding value in the case where the steered wheel is steered in the direction opposite to the direction of the yawing motion of the vehicle.

4. The steering control device for the vehicle according to claim 1, wherein the counter-steer value calculating unit calculates a counter-steer deficient value, which indicates a degree of deficiency of steering of the steered wheel in the direction opposite to the direction of the yawing motion of the vehicle, as the counter-steer value, and wherein the stabilizing force calculating unit adjusts the stabilizing force in a manner where the smaller the counter-steer deficient value is, the smaller value the stabilizing force is adjusted to be.

5. The steering control device for the vehicle according to claim 4, wherein the counter-steer value calculating unit includes an actual steering angle obtaining unit which obtains an actual steering angle corresponding value, which corresponds to an actual steering angle of the steered wheel, and a target steering angle calculating unit which calculates a target steering angle corresponding value, which is for stabilizing the vehicle and which corresponds to a target steering angle of the steered wheel in the direction opposite to the direction of the yawing motion of the vehicle, on the basis of the yawing value, so that the counter-steer deficient value is calculated on the basis of a comparison result between the target steering angle corresponding value and the actual steering angle corresponding value.

6. The steering control device for the vehicle according to claim 1, wherein the yawing value obtaining unit is configured so as to obtain an oversteer state quantity, which indicates a degree of an oversteer of the vehicle, as the yawing value, and wherein the steering control device for the vehicle further includes a braking force calculating unit which calculates a target value of a braking force to be applied to a turning outer front wheel of the vehicle on the basis of the oversteer state quantity and a braking force controlling unit which applies the braking force to the turning outer front wheel on the basis of the target value of the braking force, wherein the stabilizing force calculating unit calculates the stabilizing force to zero in a case where the oversteer state quantity is equal to or less than a threshold value and the stabilizing force calculating unit calculates the stabilizing force so as to increase from zero in response to an increase of the oversteer state quantity from the threshold value in a case where the oversteer state quantity is greater than the threshold value, so that the braking force calculating unit calculates the target value of the braking force to zero in the case where the oversteer state quantity is equal to or less than the threshold value, and so that the braking force calculating unit calculates the target value of the braking force so as to increase from zero in response to the increase of the oversteer state quantity from the threshold value in the case where the oversteer state quantity is greater than the threshold value.

7. The steering control device for the vehicle according to claim 1, wherein the yawing value obtaining unit obtains a difference of a longitudinal force between right and left wheels of the vehicle as the yawing value.

8. A steering control for a vehicle comprising:
a yawing value obtaining unit which obtains a yawing value, which is a yawing value corresponding to a yawing motion of the vehicle;
a stabilizing force calculating unit which calculates a stabilizing force for assisting an operation of a steering operation member, which is operated by a driver of the vehicle in order to steer a steered wheel of the vehicle, in a direction opposite to a direction of the yawing motion of the vehicle, on the basis of the yawing value; and
a force applying unit which applies the stabilizing force to the steering operation member in the direction opposite to the direction of the yawing motion of the vehicle, wherein
the stabilizing force calculating unit includes a counter-steer value calculating unit which calculates a counter-steer value, which indicates a degree of steering the steered wheel in the direction opposite to the direction of the yawing motion of the vehicle, and wherein
the force applying unit determines whether or not the operation of the steering operation member in the direction opposite to the direction of the yawing motion of the vehicle is performed by the driver on the basis of the counter-steer value, so that the force applying unit does not apply the stabilizing force in a case where the force applying unit determines that the operation is performed, and so that the force applying unit applies the stabilizing force in a case where the force applying unit determines that the operation is not performed.

9. The steering control device for the vehicle according to claim 8, wherein the yawing value obtaining unit is configured so as to obtain an oversteer state quantity, which indicates a degree of an oversteer of the vehicle, as the yawing value, and wherein the steering control device for the vehicle further includes a braking force calculating unit which calculates a target value of a braking force to be applied to a turning outer front wheel of the vehicle on the basis of the oversteer state quantity and a braking force controlling unit which applies the braking force to the turning outer front wheel on the basis of the target value of the braking force, wherein the stabilizing force calculating unit calculates the stabilizing force to zero in a case where the oversteer state quantity is equal to or less than a threshold value and the stabilizing force calculating unit calculates the stabilizing force so as to increase from zero in response to an increase of the oversteer state quantity from the threshold value in a case where the oversteer state quantity is greater than the threshold value, so that the braking force calculating unit calculates the target value of the braking force to zero in the case where the oversteer state quantity is equal to or less than the threshold value, and so that the braking force calculating unit calculates the target value of the braking force so as to increase from zero in response to the increase of the oversteer state quantity from the threshold value in the case where the oversteer state quantity is greater than the threshold value.

10. The steering control device for the vehicle according to claim 8, wherein the stabilizing force calculating unit calculates the stabilizing force so that the stabilizing force relative to the oversteer state quantity becomes greater than a force, which is generated due to an application of the braking force to the turning outer front wheel and which acts on the steering operation member in the direction of the yawing motion of the vehicle, within a range in which the oversteer state quantity is greater than the threshold value.

11. The steering control device for the vehicle according to claim 8, wherein the yawing value obtaining unit obtains a difference of a longitudinal force between right and left wheels of the vehicle as the yawing value.

12. A steering control device for a vehicle comprising:
a state quantity calculating unit which calculates a value corresponding to a yawing motion of the vehicle, and calculates an oversteer state quantity, which indicates a degree of an oversteer of the vehicle, on the basis of the value corresponding to the yawing motion;
a target steering angle calculating unit which calculates a target steering angle corresponding value, which stabilizes the vehicle and which corresponds to a target steering angle of a steered wheel of the vehicle in a direction opposite to a turning direction of the vehicle, on the basis of the oversteer state quantity;
an actual steering angle obtaining unit which obtains an actual steering angle corresponding value, which corresponds to an actual steering angle of the steered wheel;
a stabilizing force calculating unit which calculates a stabilizing force for assisting an operation of a steering operation member, which is operated by a driver of the vehicle in order to steer the steered wheel of the vehicle, in the direction opposite to the turning direction, on the basis of a comparison result between the target steering angle corresponding value and the actual steering angle corresponding value; and
a force applying unit which applies the stabilizing force to the steering operation member in the direction opposite to the turning direction.

13. The steering control device for the vehicle according to claim 12, wherein the stabilizing force calculating unit calculates the stabilizing force to zero in a case where a difference between the target steering angle corresponding value and the actual steering angle corresponding value is less than a threshold value, and wherein the stabilizing force calculating unit calculates the stabilizing force so as to increase in response to an increase of the difference from the threshold value in a case where the difference is equal to or greater than the threshold value.

14. The steering control device for the vehicle according to claim 13 further comprising a braking force calculating unit which calculates a target value of a braking force to be applied to a turning outer front wheel of the vehicle for stabilizing the vehicle, on the basis of the oversteer state quantity, and a braking force controlling unit applies the braking force to the turning outer front wheel on the basis of the target value of the braking force, wherein the braking force controlling unit is configured so as not to apply the braking force to the turning outer front wheel in a case where the stabilizing force is zero and so as to apply the braking force to the turning outer front wheel in a case where the stabilizing force is greater than zero.

15. The steering control device for the vehicle according to claim 14, wherein the stabilizing force calculating unit calculates the stabilizing force so as to be stepwisely increased from zero up to a predetermined value when the difference becomes the threshold value.

16. The steering control device for the vehicle according to claim 15, wherein the predetermined value is calculated on the basis of at least one of the target value of the braking force and the oversteer state quantity.

17. The steering control device for the vehicle according to claim 12, the stabilizing force calculating unit calculates the stabilizing force so as to be limited to equal to or less than a predetermined limit value.

* * * * *